United States Patent
Franklin et al.

(10) Patent No.: US 10,142,899 B2
(45) Date of Patent: Nov. 27, 2018

(54) APPARATUS AND METHOD FOR RELOCATING ANCHOR GATEWAY IN WIRELESS COMMUNICATION SYSTEM

(71) Applicant: Samsung Electronics Co., Ltd., Suwon-si (KR)

(72) Inventors: Antony Franklin, Suwon-si (KR); Ki-Suk Kweon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 137 days.

(21) Appl. No.: 14/812,692

(22) Filed: Jul. 29, 2015

(65) Prior Publication Data

US 2016/0037411 A1 Feb. 4, 2016

(30) Foreign Application Priority Data

Jul. 29, 2014 (KR) ........................ 10-2014-0096534

(51) Int. Cl.
*H04W 36/12* (2009.01)
*H04W 36/24* (2009.01)

(52) U.S. Cl.
CPC ........... *H04W 36/12* (2013.01); *H04W 36/24* (2013.01)

(58) Field of Classification Search
CPC ..... H04W 36/24; H04W 36/12; H04W 36/02; H04W 88/16; H04W 24/02; H04W 8/08; H04W 36/0011; H04W 36/0033; H04W 36/0022; H04W 36/14; H04W 88/02; H04W 88/06
See application file for complete search history.

(56) References Cited

U.S. PATENT DOCUMENTS

| | | | | |
|---|---|---|---|---|
| 2005/0036462 A1* | 2/2005 | Sillasto | ................ | H04W 36/02 370/331 |
| 2009/0176496 A1* | 7/2009 | Li | ......................... | H04L 47/767 455/437 |
| 2010/0020747 A1* | 1/2010 | Xia | ....................... | H04W 8/065 370/328 |
| 2011/0103260 A1* | 5/2011 | Jeyatharan | .......... | H04W 60/005 370/254 |
| 2011/0286410 A1* | 11/2011 | Zembutsu | ............. | H04W 36/00 370/329 |

(Continued)

FOREIGN PATENT DOCUMENTS

WO 2011095358 A1 8/2011
WO 2012134566 A1 10/2012

*Primary Examiner* — Paul H Masur
*Assistant Examiner* — Michael K Phillips
(74) *Attorney, Agent, or Firm* — McAndrews, Held & Malloy, Ltd.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). An apparatus and method for managing a connection point with a data network in a wireless communication system is provided. A method of a terminal in a wireless communication system includes: receiving, from a network entity, a request for a relocation of an anchor gateway for connecting with a data network; and transmitting a message requesting the relocation of the anchor gateway to the network entity at a time which is determined based on a rule instructed by the request.

16 Claims, 16 Drawing Sheets

(56) References Cited

U.S. PATENT DOCUMENTS

| | | | | |
|---|---|---|---|---|
| 2012/0257598 A1* | 10/2012 | Karampatsis | ......... | H04W 8/082 |
| | | | | 370/331 |
| 2013/0028172 A1* | 1/2013 | Lim | ...................... | H04W 36/12 |
| | | | | 370/315 |
| 2014/0043993 A1* | 2/2014 | Sirotkin | ............... | H04B 7/0632 |
| | | | | 370/252 |
| 2014/0169271 A1* | 6/2014 | Awano | .................... | H04W 8/12 |
| | | | | 370/328 |
| 2014/0204909 A1* | 7/2014 | Cheng | ................... | H04W 8/082 |
| | | | | 370/331 |
| 2014/0219188 A1* | 8/2014 | Bertin | .................. | H04W 36/12 |
| | | | | 370/329 |
| 2014/0293961 A1* | 10/2014 | Khay-Ibbat | ....... | H04W 36/0022 |
| | | | | 370/331 |
| 2015/0045024 A1* | 2/2015 | Lunden | ................ | H04W 48/16 |
| | | | | 455/434 |
| 2015/0117406 A1* | 4/2015 | Kim | .................. | H04W 36/0022 |
| | | | | 370/331 |
| 2015/0156660 A1* | 6/2015 | Luo | ......................... | H04W 8/02 |
| | | | | 370/230 |
| 2016/0286451 A1* | 9/2016 | Ahmad | ................. | H04W 36/12 |
| 2017/0188275 A1* | 6/2017 | Kim | ...................... | H04W 76/10 |

* cited by examiner ced coding modulation (ACM), and filter bank multi carrier (FBMC), non-orthogonal multiple access (NOMA), and sparse code multiple access (SCMA) as an advanced access technology have been developed.

APPARATUS AND METHOD FOR RELOCATING ANCHOR GATEWAY IN WIRELESS COMMUNICATION SYSTEM

PRIORITY

The present application claims priority under 35 U.S.C. § 119 to an application filed in the Korean Intellectual Property Office on Jul. 29, 2014 and assigned Serial No. 10-2014-0096534, the contents of which are incorporated herein by reference.

BACKGROUND

1. Technical Field

Exemplary embodiments of the present disclosure relate to an apparatus and method for managing a connection point with a data network in a wireless communication system.

2. Description of the Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A mobile core network or an Access Service Network (ASN) includes a plurality of network entities performing given functions, in order to provide a wireless access to mobile terminals. For example, a Packet data network-Gateway (P-GW) connects the core network to an external Packet Data Network (PDN) such as Internet.

The P-GW serves as an Internet Protocol (IP) anchor point for IP traffic which is forwarded via the P-GW. In recent years, technology for locally offloading some IP traffic without forwarding the IP traffic via a central P-GW has been suggested. An example of the technology for offloading traffic is a Selective IP Traffic Offload (SIPTO) mechanism.

The traffic by the SIPTO is processed through a local P-GW. The local P-GW functions as a P-GW for the IP traffic passing through the local P-GW, and thus the local P-GW serves as an anchor of the IP traffic. When the SIPTO is employed in a mobile network, a plurality of local P-GWs may be distributed throughout the network. The IP traffic is anchored at the local P-GW. Therefore, when the user moves after IP session initialization, a User Equipment (UE) cannot relocate the local P-GW to which the UE is attached. If the local P-GW is relocated, ongoing IP traffic may be terminated, which causes service disruption to the user. However, since an enhanced local P-GW exists for users having high mobility, maintaining the initial local P-GW may not always be the optimum choice.

SUMMARY

To address the above-discussed deficiencies, it is a primary object to provide an apparatus and method for managing a connection point with a data network in a wireless communication system.

Another object of the present disclosure is to provide an apparatus and method for providing a service through an optimum anchor gateway in a wireless communication system.

Another object of the present disclosure is to provide an apparatus and method for relocating an anchor gateway in a wireless communication system.

Another object of the present disclosure is to provide an apparatus and method for relocating an anchor gateway without degrading user Quality of Experience (QoE) in a wireless communication system.

Another object of the present disclosure is to provide an apparatus and method for relocating an anchor gateway by considering a flow state in a wireless communication system.

Another object of the present disclosure is to provide an apparatus and method for providing information on a relocation of an anchor gateway in a wireless communication system.

According to an aspect of the present disclosure, a method of a terminal in a wireless communication system includes: receiving, from a network entity, a request for a relocation of an anchor gateway for connecting with a data network; and transmitting a message requesting the relocation of the anchor gateway to the network entity at a time which is determined based on a rule instructed by the request.

According to another aspect of the present disclosure, a method of a network entity in a wireless communication system includes: when a new anchor gateway for a terminal is determined, identifying information on session continuity of the terminal; and transmitting a message corresponding to the information on the session continuity.

According to another aspect of the present disclosure, a method of a network entity in a wireless communication system includes: generating a message including information on session continuity; and transmitting the message.

According to another aspect of the present disclosure, a terminal in a wireless communication system includes: a receiver configured to receive, from a network entity, a request for a relocation of an anchor gateway for connecting with a data network; and a transmitter configured to transmit a message requesting the relocation of the anchor gateway to the network entity at a time which is determined based on a rule instructed by the request.

According to another aspect of the present disclosure, a network entity in a wireless communication system includes: a controller configured to, when a new anchor gateway for a terminal is determined, identify information on session continuity of the terminal; and a communication unit configured to transmit a message corresponding to the information on the session continuity.

According to another aspect of the present disclosure, a network entity in a wireless communication system includes: a controller configured to generate a message including information on session continuity; and a communication unit configured to transmit the message.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, techniques for controlling a data path in a wireless communication system will be explained. In particular, the present disclosure pertains to techniques for relocating an anchor gateway.

The terms indicating network entities and the terms indicating connection states, which are used in the following description, are only for the convenience of explanation. Therefore, the present disclosure is not limited to the terms described below and other terms indicating objects having the same technical meanings may be used. For example, the term "terminal" used herein below may be replaced with "User Equipment (UE)," "Mobile Station (MS)," and "Mobile Terminal (MT)."

There may exist a plurality of gateways for providing connection with an external Packet Data Network (PDN) such as Internet in order to offload traffic processing in a wireless access network or a mobile core network. Herein, the gateway may be referred to as a "Packet data network-Gateway (P-GW)." Therefore, a terminal may transmit and receive traffic via a different P-GW according to a location where initial access is achieved. The P-GW, which serves as a connection point with the external PDN for a specific terminal, may be referred to as an "anchor gateway" of the specific terminal. However, since the terminal is movable, it is not guaranteed that an initially selected P-GW is always an optimum P-GW. For example, FIGS. 1A and 1B illustrate examples of a situation in which the P-GW needs to be relocated.

Figure 1A:
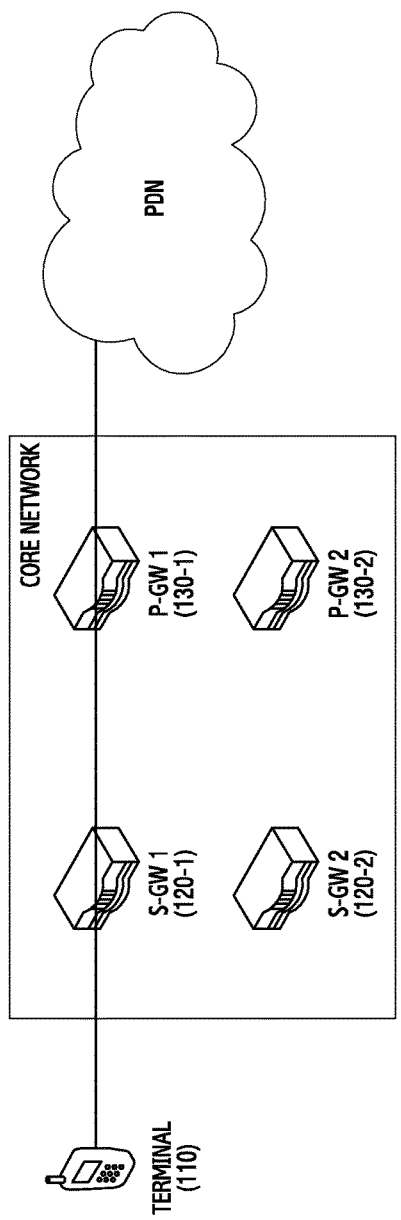
FIGS. 1A and 1B illustrate views showing examples of a situation in which a gateway needs to be relocated in a wireless communication system according to an exemplary embodiment of the present disclosure.
Figure 1B:
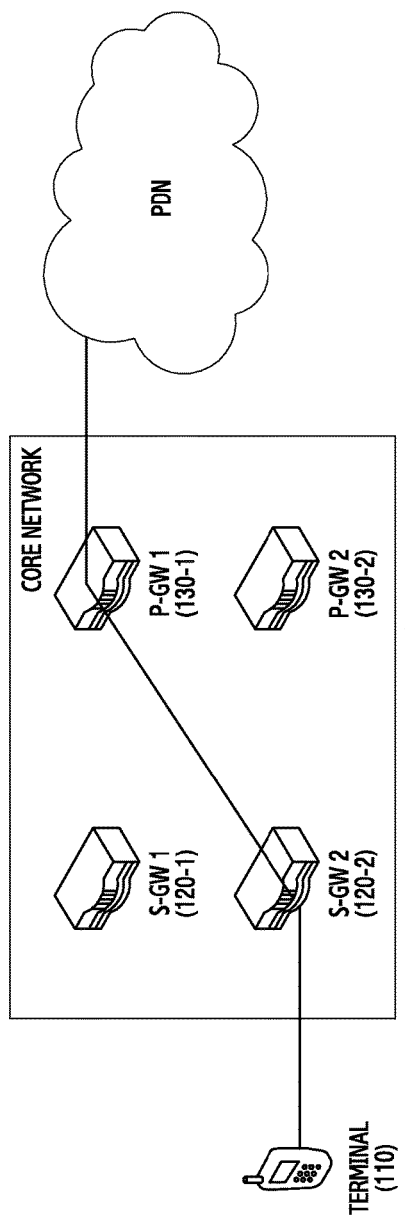

FIGS. 1A and 1B illustrate views showing an example of a situation in which a gateway needs to be relocated in a wireless communication system according to an exemplary embodiment of the present disclosure. Referring to FIGS. 1A and 1B, a core network includes a plurality of Serving-Gateways (S-GWs) 120-1 and 120-2, and a plurality of P-GWs 130-1 and 130-2. The S-GWs 120-1 and 120-2 are gateways for controlling routing and forwarding of packets transmitted to/received from a terminal 110, and may be relocated according to movement of the terminal 110. Although not shown in FIG. 1, the core network may further include a base station and network entities such as Mobile Management Entities (MMEs). The base station may be referred to as an "evolved NodeB (eNB)."

Referring to view FIG. 1A, the terminal 110 is connected with an external PDN via the first S-GW1 120-1 and P-GW1 130-1. In this case, the P-GW1 130-1 is an anchor gateway of the terminal 110. Thereafter, when the terminal 110 moves as shown in view of FIG. 1B, the gateway for processing the routing is relocated to the S-GW2 120-2. However, the anchor gate serving as a connection point with the PDN is maintained as the P-GW1 130-1. However, the P-GW2 130-2 rather than the P-GW1 130-1 may be the optimum anchor gateway for the terminal 110 and thus a procedure for relocating the anchor gateway of the terminal 110 to the P-GW2 130-2 may be needed.

As described above, the P-GW may need to be relocated. However, the relocation of the P-GW involves the change of an IP address. As such, when the P-GW is relocated by the network without recognizing an ongoing IP flow in the terminal, the relocation may cause degradation of User eXperience (UX) or user's QoE. Therefore, various exemplary embodiments of the present disclosure propose a P-GW relocation procedure considering the QoE of flows.

When the P-GW is relocated based on the network, the interference by the ongoing flows in the terminal may badly affect the user QoE. However, considering that there are a variety of services, all applications may not always require session continuity. In other words, the necessity for the session continuity may depend on an application. In addition, the necessity for the session continuity may change with time. That is, a request for session continuity may be changed according to a kind of application or a state of an application. Therefore, there may be a situation where the IP session is broken without degrading the QoE.

Hereinafter, various exemplary embodiments for relocating an anchor gateway by minimizing degradation of QoE will be explained. In the following explanation, "P-GW relocation" has the same meaning as "anchor gateway relocation."

Exemplary embodiments of the present disclosure include two kinds of methods for relocating a P-GW. The first method is time-independent P-GW relocation, and the second method is time-dependent P-GW relocation.

In the case of the time-independent P-GW relocation, the P-GW is relocated based on partial flow information. When session continuity is needed according to the flow information, the P-GW is not relocated until a corresponding session is terminated. On the other hand, when the session continuity is not needed, the P-GW may be relocated as a more appropriate P-GW is found. In this case, the network determines whether the P-GW should be relocated or not according to a state change of a terminal. It may be determined whether the session continuity should be provided for a flow according to various criteria.

For example, it may be determined whether the session continuity is needed or not based on at least one of a kind of application (e.g., a voice call, video streaming, a File Transfer Protocol (FTP) session, a chatting application, or the like), an application provider (e.g., an external service provider, a network operator), user subscription information (e.g., Gold, Silver, Bronze), and an operator policy (e.g., rules defined by an operator to determine session continuity, etc.). The criteria for determining to what kind of application, what application provider, or what subscriber rank the continuity will be provided may vary according to an exemplary embodiment and an intension of a person who embodies the present disclosure.

In the case of the time-dependent P-GW relocation, the P-GW relocation may be triggered based on a current state of a flow. This is because all applications do not need session continuity. Therefore, the P-GW relocation is triggered when the session continuity is not critical to the flow. For example, the terminal may determine a time that the P-GW relocation does not badly affect the QoE of the flow, and trigger the P-GW relocation.

Specifically, in the case of Hyper Text Transfer Protocol (HTTP)-based video streaming, when a video reproduction device has a sufficient video buffer, the P-GW relocation may not stall video reproduction. Therefore, when the P-GW relocation is triggered after a predetermined chunk of data has been downloaded, the application may not recognize the loss of continuity.

In another example, in the case of online radio, when the P-GW relocation is achieved after a track has been downloaded, the user QoE may not be affected. The next track may be downloaded through a new P-GW after relocation.

In another example, in the case of a chatting application/Social Network Service (SNS) application, when a current user does not interact with the application, the P-GW relocation may not badly affect the user QoE. The P-GW relocation may disconnect a keep-alive session, but the session may be re-established after the P-GW relocation. The user may not recognize the degradation of the QoE.

In another example, in the case of a web application, when the P-GW relocation is triggered after an active component has been downloaded, the user QoE may not be degraded. In other words, the P-GW relocation may not stall or stop web page loading.

The system according to an exemplary embodiment of the present disclosure may support the above-described two kinds of P-GW relocation methods. The time-independent P-GW relocation and the time-dependent P-GW relocation may be selectively performed according to circumstances. To select an appropriate P-GW relocation method, the system according to an exemplary embodiment of the present disclosure considers a plurality of levels of session continuity. For example, three levels of session continuity may be defined. Specifically, the levels of the session continuity may include "no session continuity" as a first level, "always session continuity" as a second level, and "on-demand session continuity" as a third level. The "no session continuity" means that the P-GW relocation is always accepted, the "always session continuity" means that the P-GW relocation is not accepted, and the "on-demand session continuity" means that the P-GW relocation is accepted when QoE is not degraded. Accordingly, the P-GW relocation is performed based on the level of session continuity support.

The levels of the session continuity may be defined based on a subscriber or a flow. In other words, the levels of the session continuity may be assigned according to subscribers or flows. When the levels of the session continuity are assigned based on the subscribers, the levels of the session continuity may be provided through subscriber information or operator policy information. On the other hand, when the levels of the session continuity are assigned based on the flows, the levels of the session continuity may be provided through the operator policy information.

When the levels of the session continuity are assigned according to the flows, the plurality of flows owned by a single terminal may have different levels. In this case, a single level of session continuity is applied to the terminal according to pre-defined priority. For example, the level of a high requirement for the session continuity may have high priority. Specifically, the "always session continuity" may have higher priority than the other levels, the "on-demand session continuity" may have higher priority than the "no session continuity." and the "no session continuity" may have the lowest priority.

According to an exemplary embodiment, the user subscription information may include session continuity for traffic. A network operator may assign the levels of session continuity for the traffic based on the user subscription information. To achieve this, traffic offload related-information may be added to the subscription information for each Access Point Name (APN) as shown in table 1 presented below:

TABLE 1

| items | notes |
|---|---|
| traffic offload permission | Indicates whether a SIPTO is allowed at corresponding APN |

TABLE 1-continued

| items | notes |
| --- | --- |
| Levels for session continuity | a. no session continuity<br>b. always session continuity<br>c. on-demand session continuity |

Figure 2:
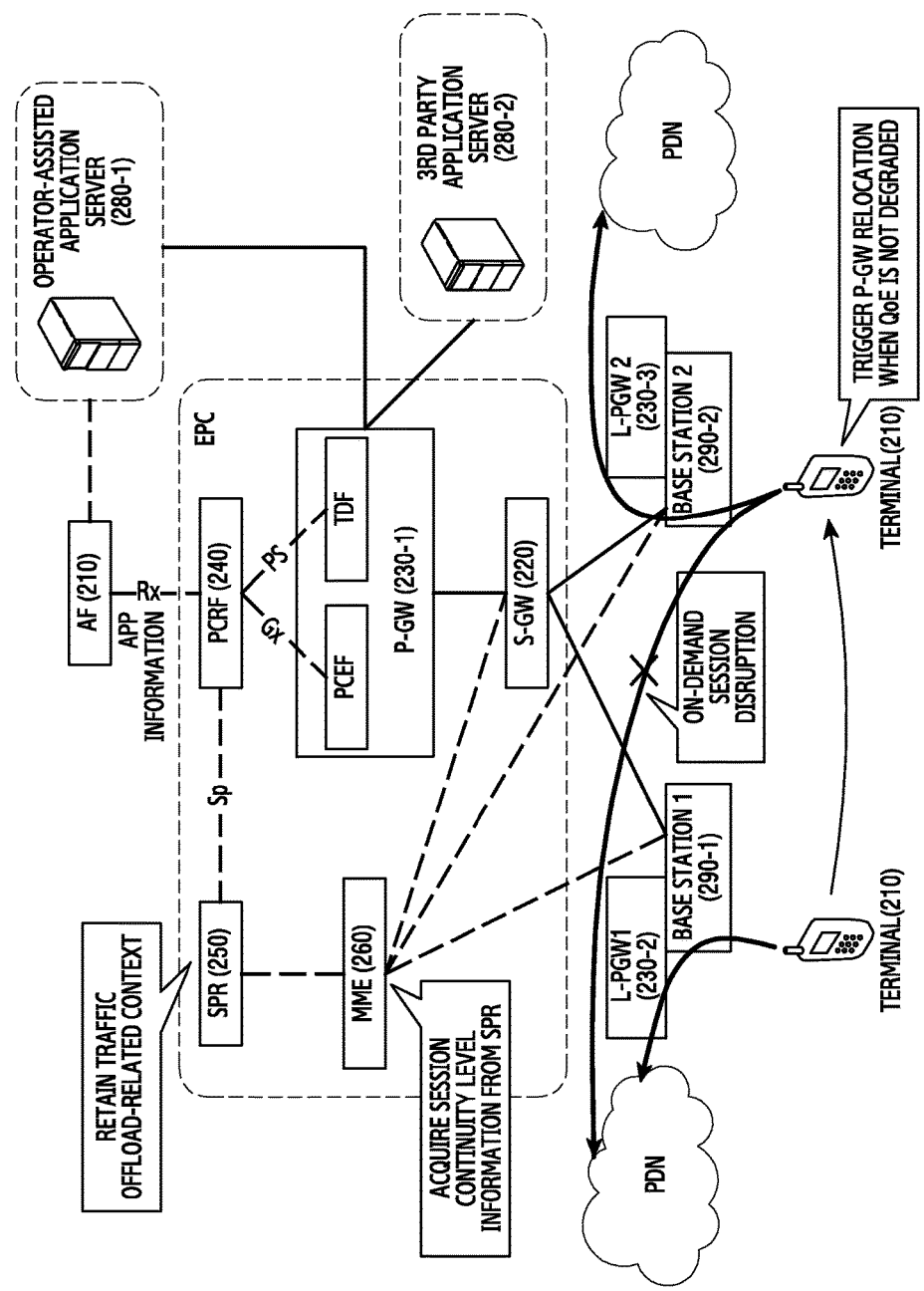
FIG. 2 illustrates a view showing a path for providing subscriber-based session continuity information in a wireless communication system according to an exemplary embodiment of the present disclosure.

According to an exemplary embodiment of the present disclosure, the traffic offload-related information may be provided via a path shown in FIG. 2. FIG. 2 illustrates a view showing a path for providing subscriber-based session continuity information in a wireless communication system according to an exemplary embodiment of the present disclosure.

As shown in FIG. 2, an Evolved Packet Network (EPC) includes an S-GW 220, a P-GW 230-1, a Policy and Charging Rules Function (PCRF) 240, a Subscription Profile Repository (SPR) 250, and an MME 260. The S-GW 220, which is a network entity for managing a user plane, controls routing of packets. The P-GW 230-1 is a connection point with an external PDN, and the PCRF 240 maintains and manages a network operator's policy. The SPR 250 stores users' subscription information, and the MME 260, which is a network entity for managing a control plane, manages mobility of a terminal. According to an exemplary embodiment, the SPR 250 retains a traffic offload-related context of each subscriber in addition to the information on the subscribers. For example, the traffic offload-related context may include information shown in table 1.

In addition, an operator assisted application server 280-1 may be connected via the P-GW 230-1 via an Application Function (AF) 270. The AP 270 is a network entity which provides information on an application to the PCRF 240. In addition, a $3^{rd}$ party application server 280-2 may be connected via the P-GW 230-1.

An interface between the SPR 250 and the PCRF 240 may be referred as "Sp," an interface between the PCRF 240 and a Policy and Charging Enforcement Function (PCEF) of the P-GW 230-1 may be referred to as 'Gx,' and an interface between the PCRF 240 and a Traffic Detection Function (TDF) of the P-GW 230-1 may be referred to as "Sd." An interface between the AP 270 and the PCRF 240 may be referred to as "Rx."

A terminal 210 may wirelessly access via a first base station 290-1 and access the external PDN (e.g., Internet) via a local (L)-PGW1 230-2. After the terminal 210 accesses the network, the traffic offload-related context may be fetched from the SPR 250 and stored in the MME 260. In other words, the MME 260 receives the traffic offload-related context on the user of the terminal 210 from the SPR 250 and stores the traffic offload-related context. Thereafter, the terminal 210 is handed over to a base station 2 290-2 by movement. In this case, an L-PGW2 230-3 is selected as an optimum anchor gateway. Therefore, it is determined whether the P-GW is relocated or not according to a level of session continuity applied to the terminal 210. In the case of FIG. 2, the level of the session continuity of the terminal 210 is "on-demand session continuity." Accordingly, if it is determined that QoE is not degraded, the terminal 210 or the network triggers the P-GW relocation. If the P-GW relocation is triggered by the network, the MME 260 may trigger the P-GW relocation.

Figure 3:
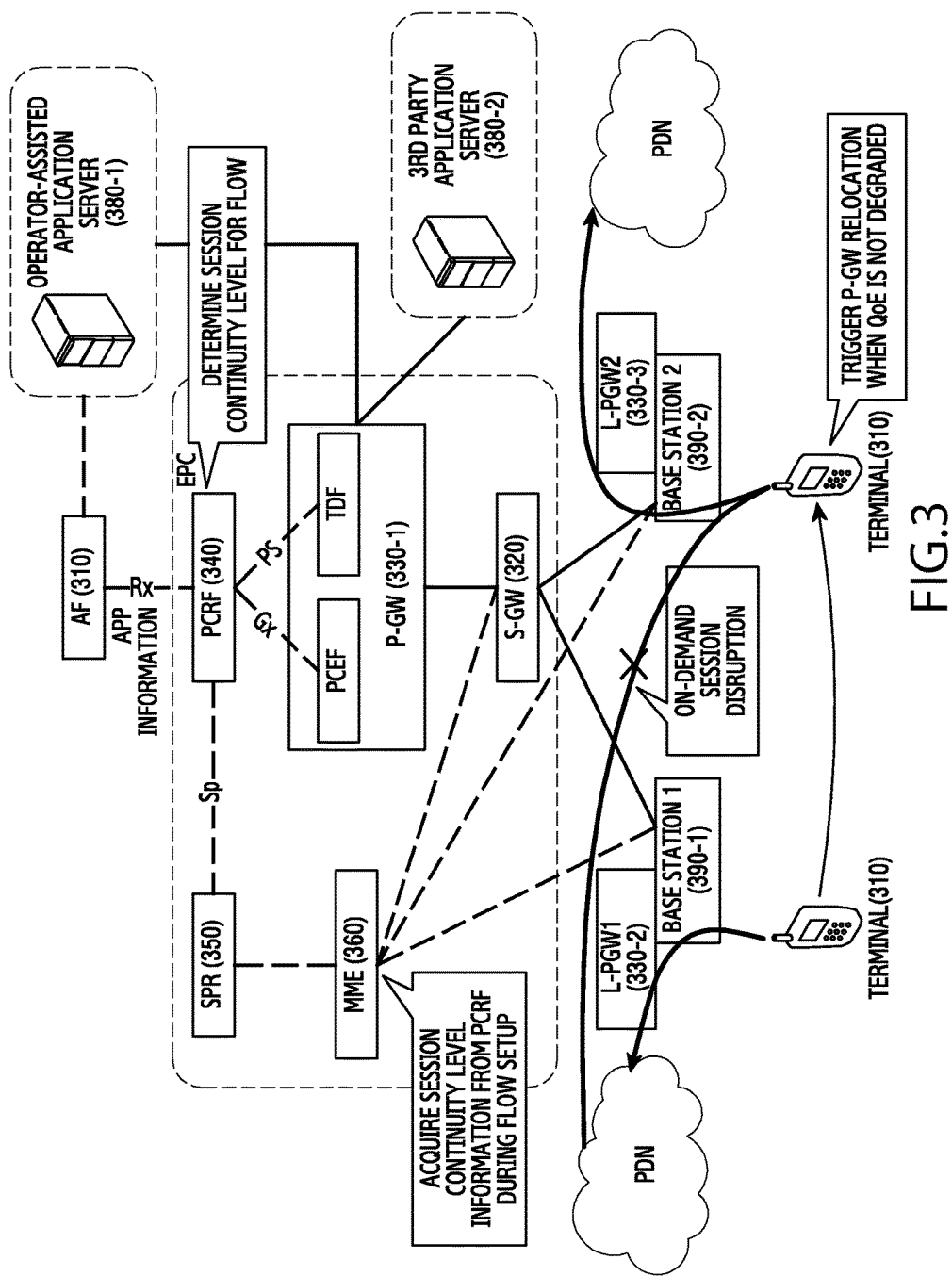
FIG. 3 illustrates a view showing a path for providing policy-based session continuity information in a wireless communication system according to an exemplary embodiment of the present disclosure.

According to another exemplary embodiment of the present disclosure, the network operator may define the level of the session continuity and the level of the session continuity may be provided for each flow level or a user level. In the case of session continuity which varies according to the flow, the terminal may have different levels of session continuity for different applications. In this case, the PCRF may provide authorization of the session continuity for each flow based on the operator policy. In this case, tighter control may be performed for the session continuity. For example, the levels of the session continuity by the policy may be determined based on a flow type (e.g., a web, audio streaming, video streaming, adaptive streaming, gaming, etc.), user subscription information (e.g., gold/silver/bronze), an application provider (e.g., who provides a service), and the like. In this case, information on the session continuity may be provided as shown in FIG. 3. FIG. 3 illustrates a view showing a path for providing policy-based session continuity information in a wireless communication system according to an exemplary embodiment of the present disclosure.

As shown in FIG. 3, an EPC includes an S-GW 320, a P-GW 330-1, a PCRF 340, an SPR 350, and MME 360. The S-GW 320, which is a network entity for managing a user plane, controls routing of packets. The P-GW 330-1 is a connection point with an external PDN, and the PCRF 340 maintains and manages a network operator's policy. The SPR 350 stores users' subscription information, and the MME 360, which is a network entity for managing a control plane, manages mobility of a terminal. In addition, an operator assisted application server 380-1 may be connected via the P-GW 330-1 via an AF 370. The AP 370 is a network entity which provides information on an application to the PCRF 340. In addition, a $3^{rd}$ party application server 380-2 may be connected via the P-GW 330-1. An interface between the SPR 350 and the PCRF 340 may be referred to as "Sp," an interface between the PCRF 340 and a PCEF of the P-GW 330-1 may be referred to as "Gx," and an interface between the PCRF 340 and a TDF of the P-GW 330-1 may be referred to as "Sd." An interface between the AP 370 and the PCRF 340 may be referred to as "Rx."

A terminal 310 may wirelessly access via a first base station 310-1 and access the external PDN (e.g., Internet) via an L-PGW1 330-2. After the terminal 310 accesses the network, the PCRF 340 determines a level of session continuity for a corresponding flow in a flow setup process. In other words, the PCRF 340 determines the level of the session continuity based on an operator policy which is determined based on various factors. For example, the PCRF 340 authenticates the level of the session continuity of the terminal 310 during a bearer setup procedure, and provides information on the determined level of the session continuity to the MME 360. That is, the MME 360 acquires the information on the level of the session continuity from the PCRF 340 during the flow setup. Thereafter, the terminal 310 is handed over to a base station 2 390-2 by movement. In this case, an L-PGW2 330-3 is selected as an optimum anchor gateway. Therefore, it is determined whether the P-GW is relocated or not according to a level of session continuity applied to the terminal 310. In the case of FIG. 3, the level of the session continuity of the terminal 310 is "on-demand session continuity." Accordingly, when it is determined that QoE is not degraded, the terminal 310 or the network triggers the P-GW relocation. When the P-GW relocation is triggered by the network, the MME 360 may trigger the P-GW relocation.

Figure 5:
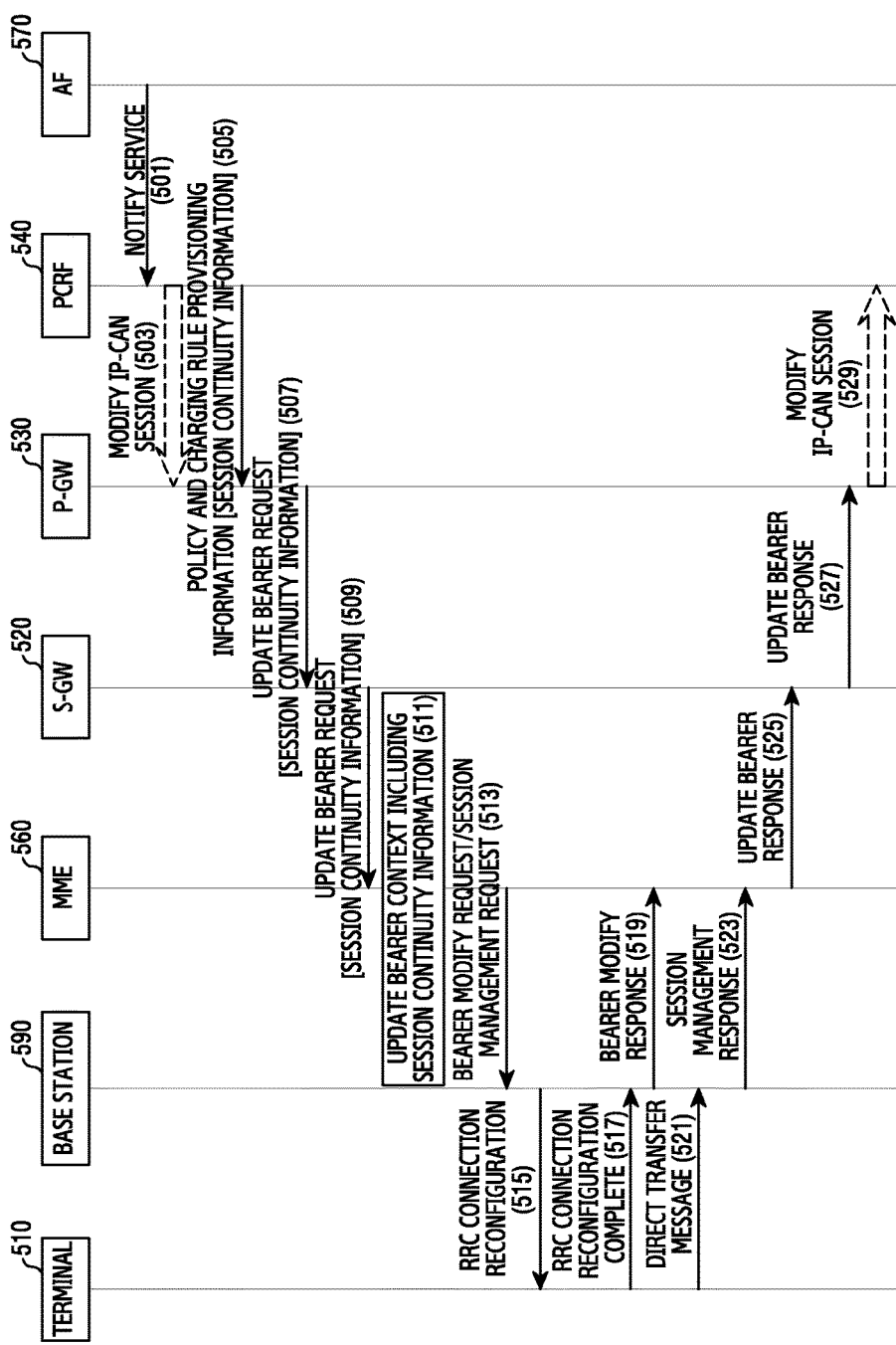
FIG. 5 illustrates a view showing exchange of signals for providing session continuity information through a bearer modification procedure in a wireless communication system according to an exemplary embodiment of the present disclosure.
Figure 6:
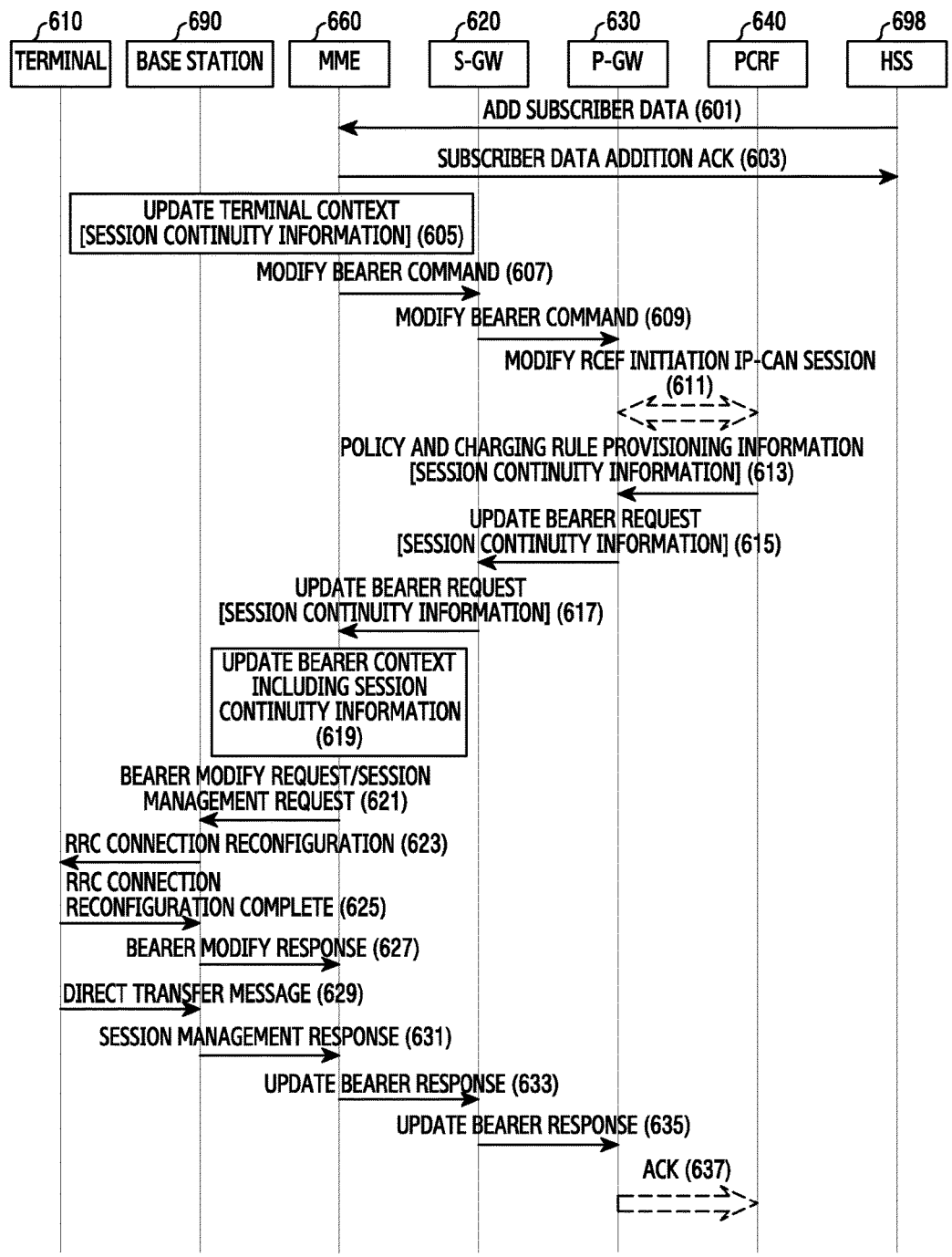
FIG. 6 illustrates a view showing exchange of signals for providing session continuity information through a bearer modification procedure, which is initiated by a Home Subscriber Server (HSS) in a wireless communication system according to an exemplary embodiment of the present disclosure.

In the P-GW relocation procedure described with reference to FIG. 3, the MME acquires session continuity information from the PCRF. The session continuity information may be provided to the MME through signaling of various methods. For example, the session continuity information may be forwarded through one of a bearer activation procedure and a bearer modification procedure. In other words, the session continuity information may be included in at least one message for the bearer activation procedure or the bearer modification procedure. Specifically, the session continuity information may be forwarded as shown in FIGS. 4, 5, and 6.

Figure 4:
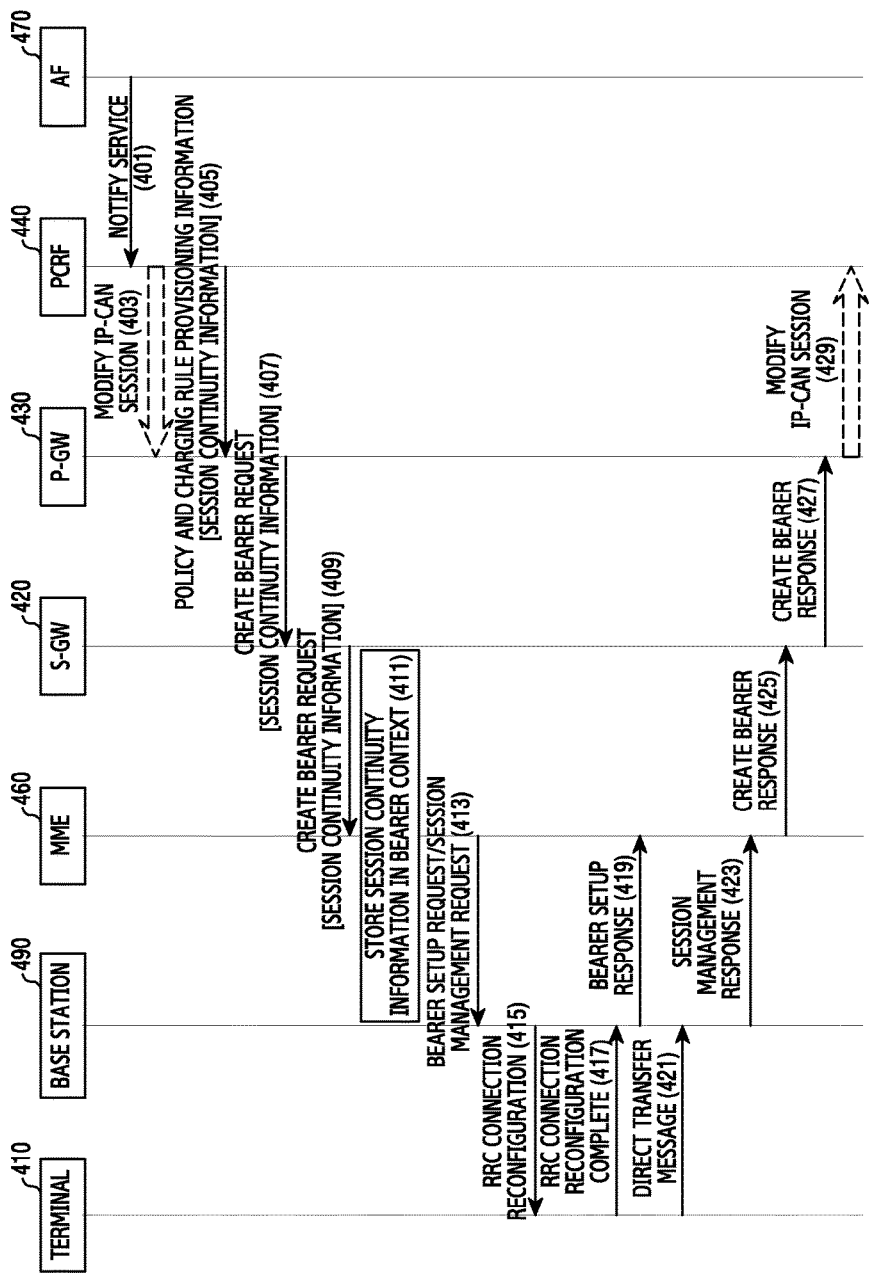
FIG. 4 illustrates a view showing exchange of signals for providing session continuity information through a bearer activation procedure in a wireless communication system according to an exemplary embodiment of the present disclosure.

FIG. 4 illustrates a view showing exchange of signals for providing session continuity information through a bearer activation procedure in a wireless communication system according to an exemplary embodiment of the present disclosure.

Referring to FIG. 4, in step 401, an AF 470 transmits a service notification to a PCRF 440. The service notification includes information on a service to be provided to a terminal 410. According to an exemplary embodiment of the present disclosure, step 401 may be omitted in the bearer activation procedure.

In step 403, the PCRF 440 and a P-GW 430 perform an IP-Connectivity Access Network (CAN) session modification procedure. In this case, dynamic Policy and Charging Control (PCC) may be applied. When a local policy other than the dynamic PCC is applied, step 403 may be omitted.

In step 405, the PCRF 440 transmits policy and charging rule provisioning information to the P-GW 430. The session continuity information on the terminal 410 may be transmitted along with the policy and charging rule. The session continuity information may be included in the policy and charging rule. According to an exemplary embodiment, step 405 may be included in step 403.

In step 407, the P-GW 430 transmits a create bearer request message to an S-GW 420. The create bearer request message instructs to create a bearer and includes information on the bearer (e.g., a context, identification information, and service quality information of a bearer). In particular, according to an exemplary embodiment of the present disclosure, the create bearer request message may include the session continuity information.

In step 409, the S-GW 420 transmits the create bearer request message to an MME 460. The create bearer request message instructs to create a bearer and includes information on the bearer (e.g., a context, identification information, and service quality information of a bearer). In particular, according to an exemplary embodiment of the present disclosure, the create bearer request message may include the session continuity information.

In step 411, the MME 460 stores the session continuity information. The MME 460 stores and maintains the context on the bearer, and stores the session continuity information in the context on the bearer. According to another exemplary embodiment of the present disclosure, the session continuity information may be stored separately from the context. Accordingly, the MME 460 guarantees the session continuity information on the terminal 410.

In step 413, the MME 460 transmits a bearer setup request/session management request message to a base station 490. The bearer setup request/session management request message includes a QoS parameter of a bearer, QoS class identification information (QoS class identifier (QCI)), bandwidth restriction information (e.g., Aggregated Maximum Bit Rate (AMBR)), and the like.

In step 415, the base station 490 transmits a Radio Resource Control (RRC) connection reconfiguration message to the terminal 410. The RRC connection reconfiguration message instructs the terminal 410 to change or create RRC connection. For example, the RRC connection reconfiguration message includes information necessary for creating or changing RRC connection, such as wireless bearer identification information or the like. The RRC connection reconfiguration message may include an attach accept message.

In step 417, the terminal 410 transmits an RRC connection reconfiguration complete message to the base station 490. That is, the terminal 410 transmits a response to the RRC connection reconfiguration message received in step 415. That is, the RRC connection reconfiguration complete message informs that the creation of the RRC connection is completed. In step 419, the base station 490 transmits a bearer setup response to the MME 460. That is, the base station 490 transmits a response to the bearer setup request message received in step 413.

In step 421, the terminal 410 transmits a direct transfer message to the base station 490. The direct transfer message may include an attach complete message. The attach complete message may include bearer identification information, a session management response, or the like. In step 423, the base station 423 transmits a session management response message to the MME 460. That is, the base station 423 transmits a response to the session management request message received in step 413. In step 425, the MME 460 transmits a create bearer response message to the S-GW 420. That is, the MME 460 transmits a response to the create bearer request message received in step 409. The create bearer response message may include a context on the bearer or the like.

In step 427, the S-GW 420 transmits the create bearer response message to the P-GW 430. That is, the S-GW 420 transmits a response to the create bearer request message received in step 407. The create bearer response message may include a context on the bearer or the like. In step 429, the P-GW 430 and the PCRF 440 perform an IP-CAN session modification procedure.

FIG. 5 illustrates a view showing exchange of signals for providing session continuity information through a bearer modification procedure in a wireless communication system according to an exemplary embodiment of the present disclosure.

Referring to FIG. 5, in step 501, an AF 570 transmits a service notification to a PCRF 540. The service notification includes information on a service to be provided to a terminal 510. In some cases, step 501 may be omitted in the bearer activation procedure.

In step 503, the PCRF 540 performs an IP-CAN session modification procedure with respect to a P-GW 530. In this case, dynamic PCC may be applied. When a local policy other than the dynamic PCC is applied, step 503 may be omitted.

In step 505, the PCRF 540 transmits policy and charging rule provisioning information to the P-GW 530. Herein, session continuity information on the terminal 510 may be transmitted along with the policy and charging rule. The session continuity information may be included in the policy and charging rule. According to another exemplary embodiment, step 505 may be included in step 503.

In step 507, the P-GW 530 transmits an update bearer request message to an S-GW 520. The update bearer request message instructs to change a bearer and includes information on the bearer (e.g., a context, identification information, and service quality information of a bearer). In particular, according to an exemplary embodiment of the present disclosure, the update bearer request message may include the session continuity information.

In step 509, the S-GW 520 transmits the update bearer request message to the MME 560. The update bearer request message instructs to change a bearer and includes information on the bearer (e.g., a context, identification information, and service quality information of a bearer). In particular, according to an exemplary embodiment of the present disclosure, the update bearer request message may include the session continuity information.

In step 511, the MME 560 stores the session continuity information. The MME 560 stores and maintains the context on the bearer, and stores the session continuity information by updating the context of the bearer. According to another exemplary embodiment of the present disclosure, the session continuity information may be stored separately from the context. Accordingly, the MME 560 guarantees the session continuity information on the terminal 510.

In step 513, the MME 560 transmits a bearer modify request/session management request message to a base station 590. The bearer modify request/session management request message may include a QoS parameter of a bearer, QoS class identification information, bandwidth restriction information (e.g., AMBR), and the like.

In step 515, the base station 590 transmits an RRC connection reconfiguration message to the terminal 510. The RRC connection reconfiguration message instructs the terminal 510 to change or create RRC connection. For example, the RRC connection reconfiguration message includes information necessary for creating or changing RRC connection, such as wireless bearer identification information or the like.

In step 517, the terminal 510 transmits an RRC connection reconfiguration complete message to the base station 590. That is, the terminal 510 transmits a response to the RRC connection reconfiguration message received in step 515. That is, the RRC connection reconfiguration complete message informs that the change of the RRC connection is completed. In step 519, the base station 590 transmits a bearer modify response message to the MME 560. That is, the base station 590 transmits a response to the bearer modify request message received in step 513.

In step 521, the terminal 510 transmits a direct transfer message to the base station 590. In step 523, the base station 523 transmits a session management response message to the MME 560. That is, the base station 523 transmits a response to the session management request message received in step 513. In step 525, the MME 560 transmits an update bearer response message to the S-GW 520. That is, the MME 560 transmits a response to the update bearer request message received in step 509. The update bearer response message may include the context on the bearer or the like.

In step 527, the S-GW 520 transmits the update bearer response message to the P-GW 530. That is, the S-GW 520 transmits a response to the update bearer request message received in step 507. The update bearer response message may include the context on the bearer or the like. In step 529, the P-GW 530 and the PCRF 540 perform an IP-CAN session modification procedure.

FIG. 6 illustrates a view showing exchange of signals for providing session continuity information through a bearer modification procedure which is initiated by a Home Subscriber Server (HSS) in a wireless communication system according to an exemplary embodiment of the present disclosure.

Referring to FIG. 6, in step 601, an HSS 698 instructs an MME 660 to add data of a subscriber. In step 603, the MME 660 transmits, to the HSS 698, an acknowledgement (ACK) identifying that a request for addition of subscriber data has been received. In step 605, the MME 660 updates a context of the subscriber. In this case, when the data of the subscriber transmitted in step 601 includes session continuity information, the context includes the session continuity information. In step 607, the MME 660 transmits a modify bearer command message to an S-GW 620. The modify bearer command message, which is a message used in the bearer modification procedure initiated by the HSS, may include information necessary for modifying a bearer, such as bearer identification information, a bearer context, or the like. In step 609, the S-GW 620 transmits the modify bearer command message to a P-GW 630.

In step 611, the P-GW 630 and a PCRF 640 perform a PCEF initiation IP-CAN session modification procedure. In step 613, the PCRF 640 transmits policy and charging rule provisioning information to the P-GW 630. In this case, the session continuity information on the terminal 610 may be transmitted along with the policy and charging rule. The session continuity information may be included in the policy and charging rule.

In step 615, the P-GW 630 transmits an update bearer request message to an S-GW 620. The update bearer request message instructs to change a bearer and includes information on the bearer (e.g., a context, identification information, service quality information of a bearer, or the like). In particular, according to an exemplary embodiment of the present disclosure, the update bearer request message may include the session continuity information.

In step 617, the S-GW 620 transmits the update bearer request message to an MME 660. The update bearer request message instructs to change a bearer and includes information on the bearer (e.g., a context, identification information, and service quality information of a bearer). In particular, according to an exemplary embodiment of the present disclosure, the update bearer request message may include the session continuity information.

In step 619, the MME 660 stores the session continuity information. The MME 660 stores and maintains the context on the bearer, and stores the session continuity information by updating the context of the bearer. According to another exemplary embodiment of the present disclosure, the session continuity information may be stored separately from the context. Accordingly, the MME 660 guarantees the session continuity information on the terminal 610.

In step 621, the MME 660 transmits a bearer modify request/session management request message to a base station 690. The bearer modify request/session management request message may include a QoS parameter of a bearer, QoS class identification information, bandwidth restriction information (e.g., AMBR), and the like.

In step 623, the base station 690 transmits an RRC connection reconfiguration message to the terminal 610. The RRC connection reconfiguration message instructs the terminal 610 to change or create RRC connection. For example, the RRC connection reconfiguration message includes information necessary for creating or changing RRC connection, such as wireless bearer identification information or the like.

In step 625, the terminal 610 transmits an RRC connection reconfiguration complete message to the base station 690. That is, the terminal 610 transmits a response to the RRC connection reconfiguration message received in step 615. That is, the RRC connection reconfiguration complete message informs that the change of the RRC connection is completed. In step 627, the base station 690 transmits a bearer modify response message to the MME 660. That is, the base station 690 transmits a response to the bearer modify request message received in step 613.

In step 629, the terminal 610 transmits a direct transfer message to the base station 690. In step 631, the base station 623 transmits a session management response message to the MME 660. That is, the base station 623 transmits a response to the session management request message received in step 613. In step 633, the MME 660 transmits an update bearer response message to the S-GW 620. That is, the MME 660 transmits a response to the update bearer request message received in step 609. The update bearer response message may include the context on the bearer or the like.

In the exemplary embodiment illustrated in FIG. 6, when sufficient session continuity information is provided to the MME 660 through step 601, subsequent steps 607 to 637 may be omitted.

The P-GW relocation procedure according to an exemplary embodiment of the present disclosure depends on a level of session continuity. According to an exemplary embodiment of the present disclosure, when subscription information based on the session continuity is considered, the P-GW relocation may be performed for each user. According to another exemplary embodiment of the present disclosure, when a policy based on the session continuity is applied, the P-GW relocation may be performed for each flow or each user. When the MME finds a more appropriate P-GW for the terminal, the P-GW relocation activation may be initiated by the MME. Prior to activating the P-GW relocation, the MME identifies the level of the session continuity from the context of the terminal or the context of the bearer. A detailed procedure may vary according to the level of the session continuity.

Figure 7:
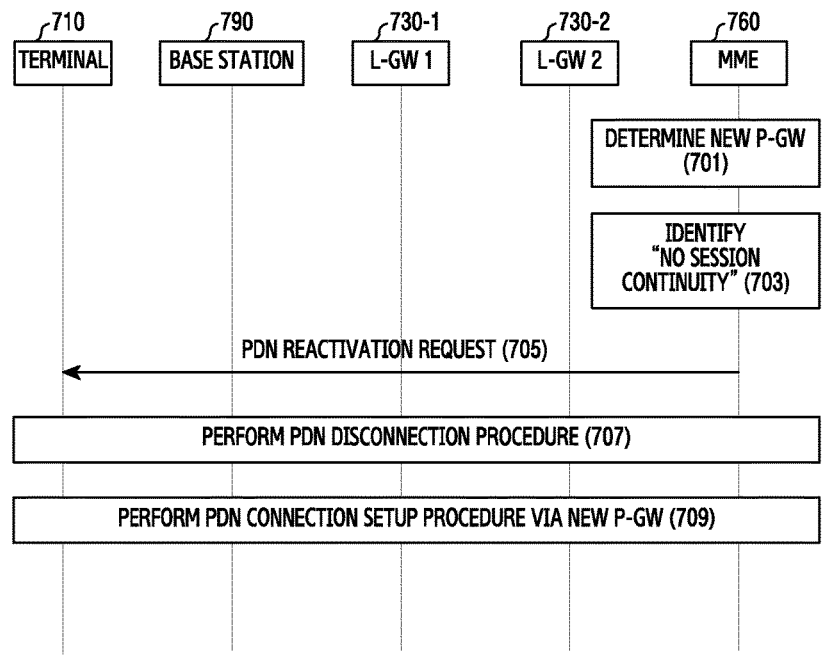
FIG. 7 illustrates a view showing a P-GW relocation procedure in a wireless communication system according to an exemplary embodiment of the present disclosure.

When the level of the session continuity is "no session continuity," the MME may determine the P-GW relocation. When the MME finds a more appropriate P-GW and the level of the session continuity for the terminal is "no session continuity," the MME deactivates the PDN and controls to reactivate the PDN in a new P-GW. Specifically, the P-GW relocation may be performed as shown in FIG. 7. FIG. 7 illustrates a view showing a P-GW relocation procedure in a wireless communication system according to an exemplary embodiment of the present disclosure.

Referring to FIG. 7, in step 701, an MME 760 determines a new P-GW. Herein, the new P-GW may be determined by movement of a terminal 710. For example, the new P-GW may be found during a Tracking Area Update (TAU) procedure. For example, the MME 760 may determine the new P-GW based on a distance to the terminal 710. Herein, the distance may include at least one of a physical distance or a logical distance. The logical distance includes a data transfer delay time. In another example, the MME 760 may determine the new P-GW based on a traffic load of a plurality of P-GWs. In another example, both the traffic load and the distance may be considered. In the exemplary embodiment of FIG. 7, an L-GW1 730-1 is a current P-GW of the terminal 710 and an L-GW2 730-2 is selected as a new P-GW.

In step 703, the MME 760 identifies session continuity information of the terminal 710. In the exemplary embodiment of FIG. 7, the MME 760 identifies that the level of the session continuity is "no session continuity." The session continuity information may be managed as a part of a context of the terminal 710 or a context of a bearer owned by the terminal 710.

In step 705, the MME 760 transmits a PDN reactivation request to the terminal 710. The PDN reactivation request is forwarded to a base station 790 and forwarded from the base station 790 to the terminal 710 via a radio channel. That is, since the level of the session continuity is "no session continuity," the MME 760 triggers P-GW relocation without considering a state of a flow of the terminal 710.

In step 707, the terminal 710, the base station 790, the L-GW1 730-1, and the MME 760 perform a PDN disconnection procedure. In other words, the terminal 710 disconnects IP layers connected through the L-GW1 730-1 which is the current P-GW. In this case, the PDN disconnection may be requested by the terminal 710 or the MME 760. For example, the PDN disconnection procedure may be performed as shown in FIG. 8 presented below.

In step 709, the terminal 710, the base station 790, the L-GW2 730-2, and the MME 760 perform a PDN connection setup procedure. In other words, the terminal 710 sets up connection of IP layers through the L-GW1 730-1 which is the new P-GW. To this end, the P-GW of the terminal 710 is relocated. That is, the P-GW may be relocated by setting up connection with the data network again after disconnecting from the data network. In this case, when the connection with the data network is set up again, the MME 760 proceeds with the connection setup procedure through the new P-GW, such that an anchor gateway for the terminal 710 is relocated. However, according to another exemplary embodiment of the present disclosure, a single procedure defined to relocate the anchor gateway may be performed instead of the procedure of two phases including the disconnection and the connection setup.

Figure 8:
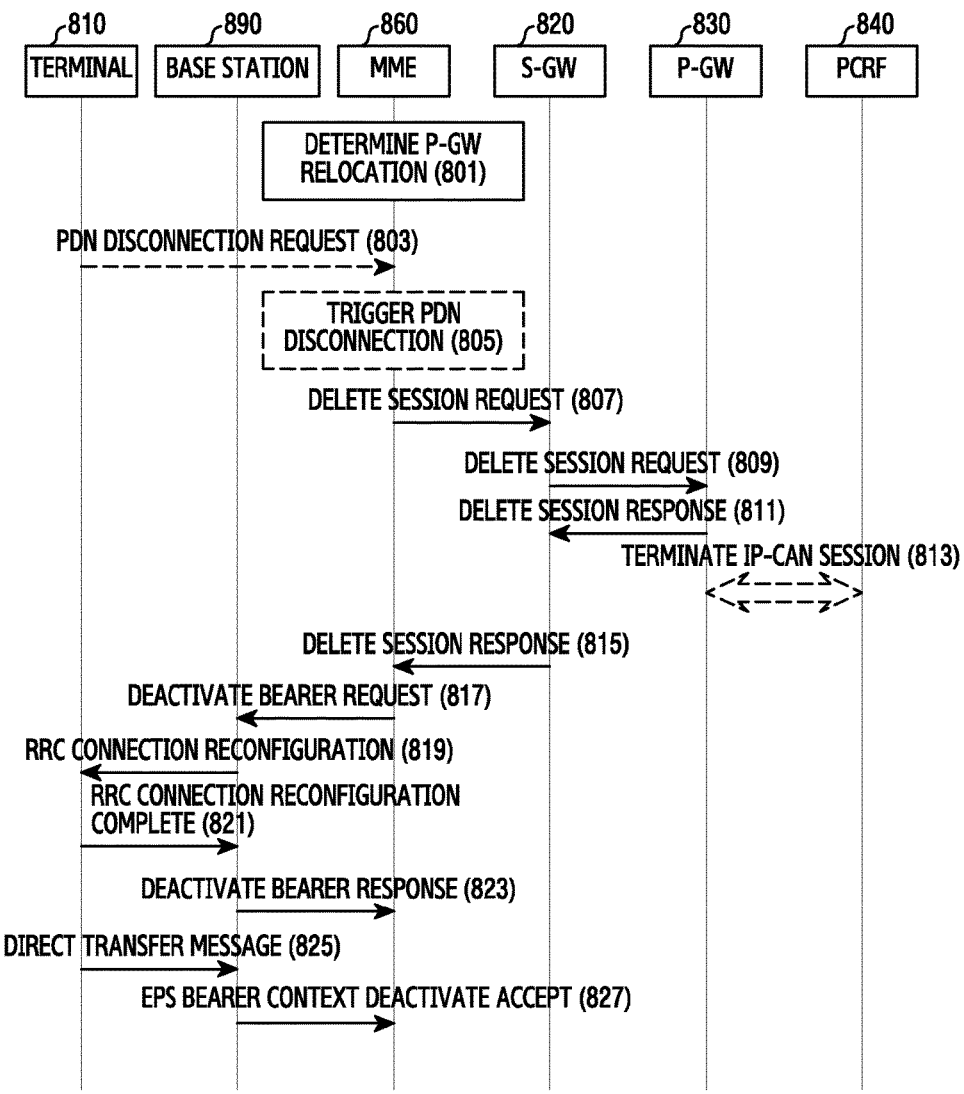
FIG. 8 illustrates a view showing a Packet Data Network (PDN) reactivation procedure in a wireless communication system according to an exemplary embodiment of the present disclosure.

FIG. 8 illustrates a view showing a PDN reactivation procedure in a wireless communication system according to an exemplary embodiment of the present disclosure.

Referring to FIG. 8, in step 801, an MME 860 determines P-GW relocation. Step 801 may be performed similarly to steps 701 and 703 of FIG. 7. For example, the MME 860 determines a new P-GW and identifies session continuity information of a terminal 810. In the exemplary embodiment of FIG. 8, the level of the session continuity of the terminal 810 is "no session continuity." Although not shown in FIG. 8, the MME 860 may transmit a P-GW reactivation request to the terminal 810.

In step 803, the terminal 810 transmits a PDN disconnection request message to the MME 860. The PDN disconnection request message informs that disconnection of IP layers connected through a P-GW 830 is requested. In step 805, the MME 860 triggers PDN disconnection. In the exemplary embodiment of FIG. 8, the level of the session continuity of the terminal 801 is "no session continuity." Therefore, since the state of a flow of the terminal 801 is not considered, a procedure for the PDN disconnection may be performed without involvement of the terminal 810 according to another exemplary embodiment of the present disclosure. For example, steps 803 and 805 may be omitted. When steps 803 and 805 are omitted, the procedure shown in FIG. 8 may be referred to as an MME-initiated PDN reactivation procedure. On the other hand, when steps 803 and 805 are performed, the procedure shown in FIG. 8 may be referred to as a terminal-initiated PDN reactivation procedure.

In step 807, the MME 860 transmits a delete session request message to an S-GW 820. In step 809, the S-GW 820 transmits the delete session request message to the P-GW 830. The delete session request message informs that disconnection from the PDN is requested. For example, the delete session request message may include a cause of disconnection, user location information, etc. In step 811, the P-GW 830 transmits a delete session response message to the S-GW 820. That is, the P-GW 830 transmits a response to the delete session request message received in step 809.

In step 813, the P-GW 830 and a PCRF 840 perform an IP-CAN session termination procedure. That is, the P-GW 830 and the PCRF 840 perform signaling for removing an IP-CAN session. For example, the P-GW 830 transmits an indication for the IP-CAN session termination to the PCRF 840, and the PCRF 840 processes information on a policy and charging rule and then transmits an ACK to the P-GW 830. According to another exemplary embodiment of the present disclosure, step 813 may be omitted.

In step 815, the S-GW 820 transmits the delete session response message to the MME 860. That is, the S-GW 820 transmits a response to the delete session request message received in step 807. In step 817, the MME 860 transmits a deactivate bearer request message to a base station 890. The deactivate bearer request message informs that deletion of a bearer owned by the terminal 810 is requested. In step 819, the base station 890 transmits an RRC connection reconfiguration message to the terminal 810. The RRC connection reconfiguration message instructs the terminal 810 to delete RRC connection. For example, the RRC connection reconfiguration message includes information necessary for deleting RRC connection, such as wireless bearer identification information or the like.

In step 821, the terminal 810 transmits an RRC connection reconfiguration complete message to the base station 890. That is, the terminal 810 transmits a response to the RRC connection reconfiguration message received in step 819. That is, the RRC connection reconfiguration complete message informs that the deletion of the RRC connection is completed. In step 823, the base station 890 transmits a deactivate bearer response message to the MME 860. That is, the base station 890 transmits a response to the deactivate bearer request message received in step 817. In step 825, the terminal 810 transmits a direct transfer message to the base station 890. In step 827, the base station 823 transmits an evolved packet system (EPS) bearer context deactivate accept message to the MME 860.

Figure 9:
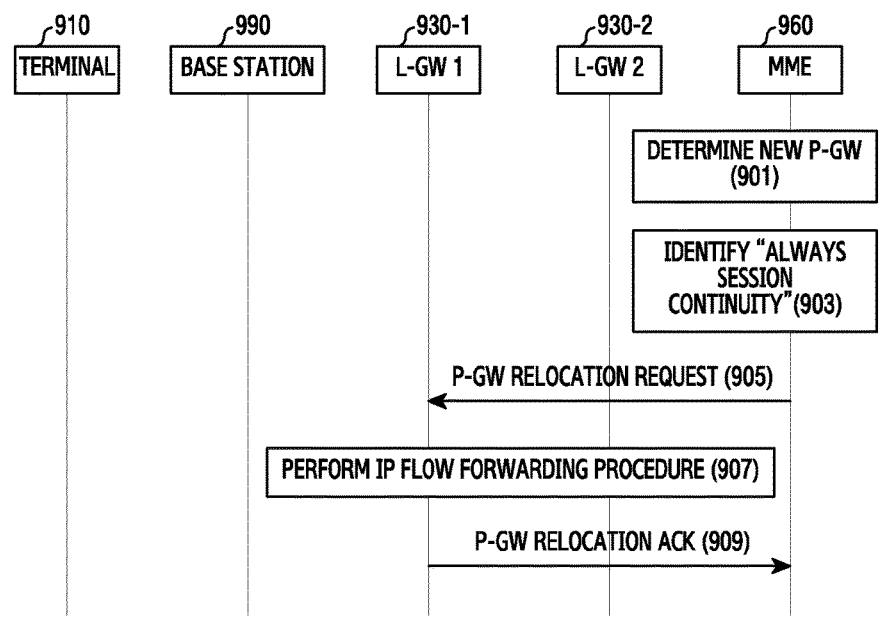
FIG. 9 illustrates a view showing a P-GW relocation procedure in a wireless communication system according to another exemplary embodiment of the present disclosure.

When the level of the session continuity is "always session continuity," the session continuity should be always guaranteed for activated flows. Therefore, P-GW relocation may not be performed. In order to provide the session continuity for the activated flows, the MME may provide IP mobility between a previous P-GW and a new P-GW. The IP mobility is to guarantee continuity of a service by maintaining a session in spite of changing an end point of IP. Specifically, the IP mobility may be provided by technology such as Mobile IP (MIP) and Proxy Mobile IP (PMIP). For example, a procedure shown in FIG. 9 may be performed. FIG. 9 illustrates a view showing a P-GW relocation procedure in a wireless communication system according to another exemplary embodiment of the present disclosure.

Referring to FIG. 9, in step 901, an MME 960 determines a new P-GW. Herein, the new P-GW may be determined by movement of a terminal 910. For example, the new P-GW may be found during a TAU procedure. For example, the MME 960 may determine the new P-GW based on a distance to the terminal 910. Herein, the distance may include at least one of a physical distance or a logical distance. The logical distance includes a data transfer delay time. In another example, the MME 960 may determine the new P-GW based on a traffic load of a plurality of P-GWs. In another example, both the traffic load and the distance may be considered. In the exemplary embodiment of FIG. 9, an L-GW1 930-1 is a current P-GW of the terminal 910 and an L-GW2 930-2 is selected as a new P-GW.

In step 903, the MME 960 identifies session continuity information of the terminal 910. In the exemplary embodiment of FIG. 9, the MME 960 identifies that the level of the session continuity is "always session continuity." The session continuity information may be managed as a part of a context of the terminal 910 or a context of a bearer owned by the terminal 910.

In step 905, the MME 960 transmits a P-GW relocation request message to the L-GW1 930-1, which is the current P-GW. The P-GW relocation request message induces IP mobility to be provided via the new P-GW. For example, the P-GW relocation request message informs that the new P-GW has been determined, and also, informs that the PDN cannot be reactivated. For example, the P-GW relocation request message may include at least one of information for indicating the L-GW2 930-2 as a new P-GW, information for requesting to provide IP mobility via the L-GW2 930-2, and information for indicating that the level of the session continuity of the terminal 910 is "always session continuity."

In step 907, the L-GW1 930-1 performs an IP flow forwarding procedure. In other words, the L-GW1 930-1 performs a procedure for providing IP mobility via the L-GW2 930-2. Specifically, the L-GW1 930-1 may generate a tunnel with the L-GW2 930-2 and sets up a routing path for forwarding traffic transmitted to the terminal 910 to the L-GW2 930-2 via the tunnel.

In step 909, the L-GW1 930-1 transmits a P-GW relocation ACK to the MME 960. That is, the L-GW1 930-1 transmits a response to the P-GW relocation request message received in step 905. Accordingly, the MME 960 may identify that the procedure for forwarding the IP flow is completed.

Figure 10:
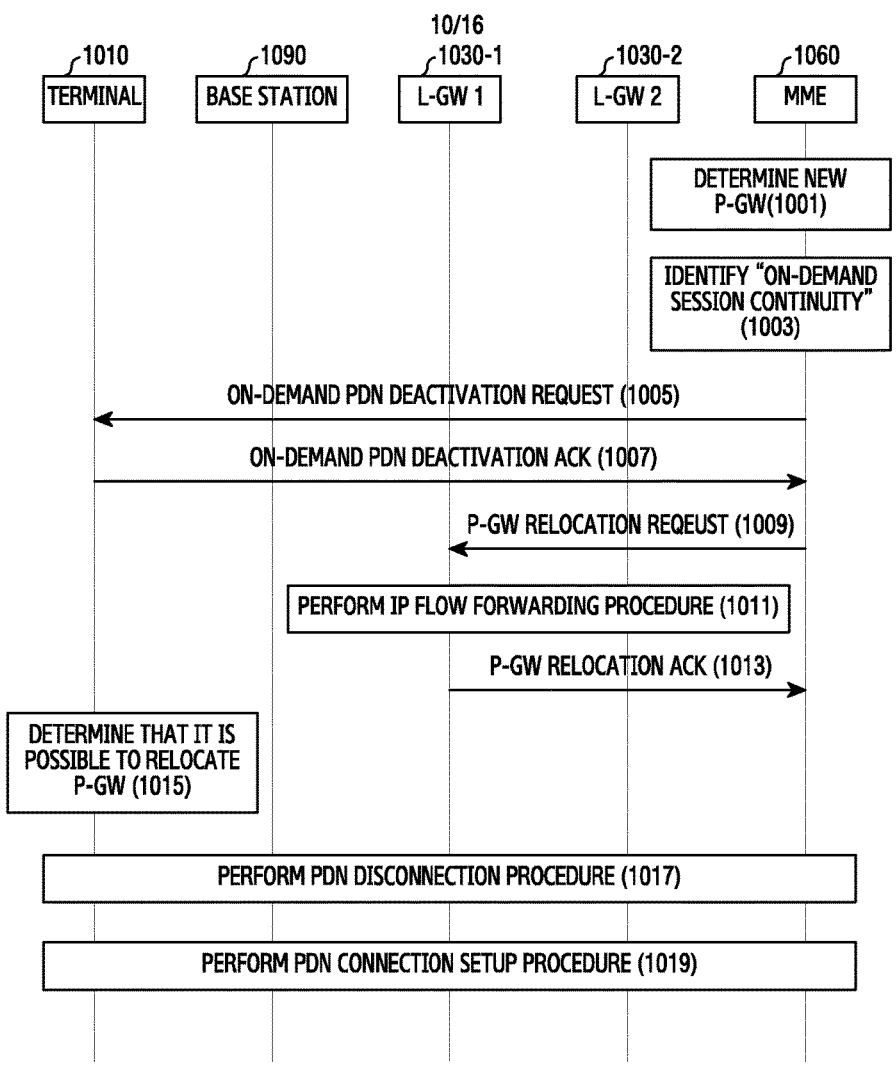
FIG. 10 illustrates a view showing a P-GW relocation procedure in a wireless communication system according to another exemplary embodiment of the present disclosure.

When the level of the session continuity is "on-demand session continuity," the MME provides IP mobility between the previous P-GW and the new P-GW first, and controls to trigger the P-GW relocation based on the state of the flow. In other words, the MME requests the terminal to initiate the P-GW relocation when the MME wishes to trigger the P-GW relocation. For example, a procedure shown in FIG. 10 may be performed. FIG. 10 illustrates a view showing a P-GW relocation procedure in a wireless communication system according to another exemplary embodiment of the present disclosure.

Referring to FIG. 10, in step 1001, an MME 1060 determines a new P-GW. Herein, the new P-GW may be determined by movement of a terminal 1010. For example, the new P-GW may be found during a TAU procedure. For example, the MME 1060 may determine the new P-GW based on a distance to the terminal 1010. Herein, the distance may include at least one of a physical distance or a logical distance. The logical distance includes a data transfer delay time. In another example, the MME 1060 may determine the new P-GW based on a traffic load of a plurality of P-GWs. In another example, both the traffic load and the distance may be considered. In the exemplary embodiment of FIG. 10, an L-GW1 1030-1 is a current P-GW of the terminal 1010 and an L-GW2 1030-2 is selected as a new P-GW.

In step 1003, the MME 1060 identifies session continuity information of the terminal 1010. In the exemplary embodiment of FIG. 10, the MME 1060 identifies that the level of the session continuity is "on-demand session continuity." The session continuity information may be managed as a part of a context of the terminal 1010 or a context of a bearer owned by the terminal 1010.

In step 1005, the MME 1060 transmits an on-demand PDN deactivation request to the terminal 1010. The PDN deactivation request is forwarded to a base station 1090 and forwarded from the base station 1090 to the terminal 1010 via a radio channel. That is, since the level of the session continuity is "on-demand session continuity", the MME 1060 requests to trigger P-GW relocation based on the state of the flow of the terminal 1010.

In step 1007, the terminal 1010 transmits an on-demand PDN deactivation ACK to the MME 1060. That is, the terminal 1010 transmits a response to the on-demand PDN deactivation request message received in step 1005. Accordingly, the MME 1060 identifies that the P-GW relocation will be triggered at a specific time afterward based on the state of the flow of the terminal 1010.

In step 1009, the MME 1060 transmits a P-GW relocation request message to the L-GW1 1030-1, which is the current P-GW. The P-GW relocation request message induces IP mobility to be provided via the new P-GW. For example, the P-GW relocation request message informs that the new P-GW has been determined, and also, informs that the PDN cannot be reactivated. For example, the P-GW relocation request message may include at least one of information for indicating the L-GW2 1030-2 as a new P-GW, and information for requesting to provide IP mobility via the L-GW2 1030-2.

In step 1011, the L-GW1 1030-1 performs an IP flow forwarding procedure. In other words, the L-GW1 1030-1 performs a procedure for providing IP mobility via the L-GW2 1030-2. Specifically, the L-GW1 1030-1 may generate a tunnel with the L-GW2 1030-2 and sets up a routing path for forwarding traffic transmitted to the terminal 1010 to the L-GW2 1030-2 via the tunnel.

In step 1013, the L-GW1 1030-2 transmits a P-GW relocation ACK to the MME 1060. That is, the L-GW1 1030-1 transmits a response to the P-GW relocation request message received in step 1009. Accordingly, the MME 1060 may identify that the procedure for forwarding the IP flow is completed.

In step 1015, the terminal 1010 determines that it is possible to relocate the P-GW. It may be determined whether it is possible to relocate the P-GW based on the state of the flow owned by the terminal 1010. That is, the terminal 1010 determines a time that the P-GW relocation does not badly affect the QoE of the flow. For example, when a sufficient video buffer is guaranteed in a video streaming service, when downloading of a specific track in an online radio service is completed, when a current user does not interact with an application in a chatting application/SNS application, or when downloading of an active component in a web application is completed, the terminal may determine that it is possible to relocate the P-GW.

In step 1017, the terminal 1010, the base station 1090, the L-GW 1030-1, and the MME 1060 performs a PDN disconnection procedure. For example, the terminal 1010 may request the MME 1060 to disconnect from the PDN via the L-GW1 1030-1. In another example, the terminal 1010 notifies the MME 1060 that the time to relocate the P-GW arrives, and the MME 1060 may trigger disconnection from the PDN connected via the L-GW1 1030-1. Thereafter, although not shown in FIG. 10, the terminal 1010, the base station 1090, the L-GW2 1030-2, and the MME 1060 may perform a PDN connection setup procedure. In other words, the terminal 1010 may set up connection of IP layers via the L-GW2 1030-2 which is the new P-GW. Accordingly, the P-GW of the terminal 1010 may be relocated. For example, the PDN disconnection procedure may be performed as shown in FIG. 11.

In step 1019, the terminal 1010, the base station 1090, the L-GW2 1030-2, and the MME 1060 perform a PDN connection setup procedure. In other words, the terminal 1010 sets up connection of IP layers through the L-GW1 1030-1 which is the new P-GW. To achieve this, the MME 1060 may transmit a message requesting to connect with the data network via the L-GW2 1030-2 to another network entity (e.g., an S-GW). Thus, the P-GW of the terminal 1010 may be relocated. That is, the P-GW may be relocated by setting up connection with the data network again after disconnecting from the data network. In this case, when the connection with the data network is set up again, the MME 1060 proceeds with the connection setup procedure through the new P-GW, such that an anchor gateway for the terminal 1010 is relocated. However, according to another exemplary embodiment of the present disclosure, a single procedure defined to relocate the anchor gateway may be performed instead of the procedure of two phases including the disconnection and the connection setup.

According to the exemplary embodiment of FIG. 10, the new P-GW of the terminal 1010 is determined, and then, the P-GW relocation is performed after a predetermined time elapses. Therefore, the optimum P-GW may be relocated again before the predetermined time elapses. In this case, the P-GW which is set up for connection as an anchor gateway in step 1019 may be different from the P-GW which is determined in step 1001.

Figure 11:
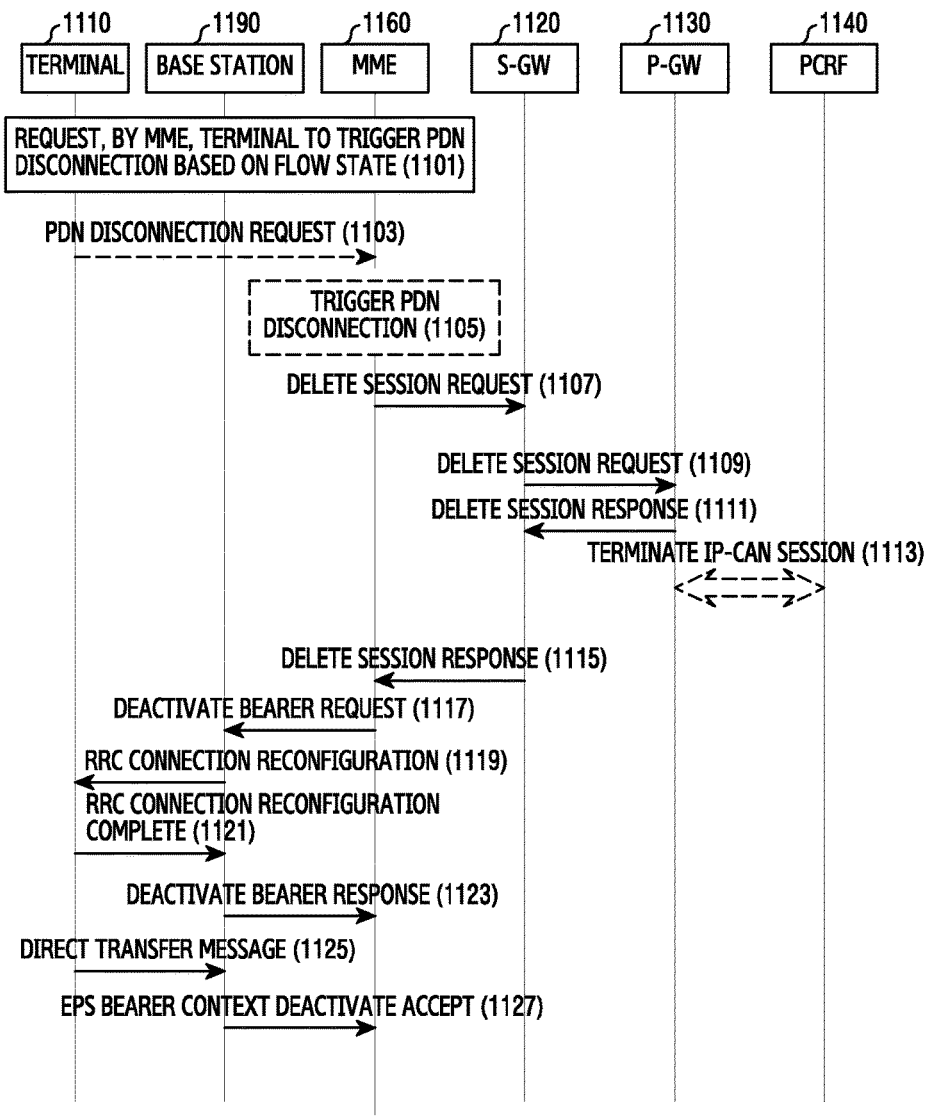
FIG. 11 illustrates a view showing a PDN deactivation procedure in a wireless communication system according to an exemplary embodiment of the present disclosure.

FIG. 11 illustrates a view showing a PDN deactivation procedure in a wireless communication system according to an exemplary embodiment of the present disclosure.

Referring to FIG. 11, in step 1101, an MME 1160 requests a terminal 1110 to trigger PDN disconnection based on a flow state. Step 1101 may be performed similarly to steps 1001 and 1005 of FIG. 10. For example, the MME 1160 determines a new P-GW and identifies session continuity information of the terminal 1110. In the exemplary embodiment of FIG. 11, the level of the session continuity of the terminal 1110 is "on-demand session continuity." Although not shown in FIG. 11, the MME 1160 may transmit a P-GW deactivation request to the terminal 1110.

In step 1103, the terminal 1110 transmits a PDN disconnection request message to the MME 1160. That is, the terminal 1110 determines that it is possible to disconnect from the PDN based on the flow state and requests to disconnect from the PDN connected via the P-GW 1130 which is the current P-GW. The PDN disconnection request message informs that disconnection of IP layers connected through the P-GW 1130 is requested. In step 1105, the MME 1160 triggers PDN disconnection. According to another exemplary embodiment of the present disclosure, steps 1103 and 1105 may be omitted. When steps 1103 and 1105 are omitted, the procedure shown in FIG. 11 may be referred to as an MME-initiated PDN deactivation procedure. In this case, the terminal 1110 may provide information on the state of the flow to the MME 1160 such that the MME 1160 determines the time to relocate the P-GW. In addition, the terminal 1110 may notify the MME 1160 that the time to accept the P-GW relocation arrives. On the other hand, when steps 1103 and 1105 are performed, the procedure shown in FIG. 11 may be referred to as a terminal-initiated PDN deactivation procedure.

In step 1107, the MME 1160 transmits a delete session request message to an S-GW 1120. In step 1109, the S-GW 1120 transmits the delete session request message to the P-GW 1130. The delete session request message informs that disconnection from the PDN is requested. For example, the delete session request message may include a cause of disconnection, user location information, etc. In step 1111, the P-GW 1130 transmits a delete session response message to the S-GW 1120. That is, the P-GW 1130 transmits a response to the delete session request message received in step 1109.

In step 1113, the P-GW 1130 and a PCRF 1140 perform an IP-CAN session termination procedure. That is, the P-GW 1130 and the PCRF 1140 perform signaling for removing an IP-CAN session. For example, the P-GW 1130 transmits an indication for the IP-CAN session termination to the PCRF 1140, and the PCRF 1140 processes information on a policy and charging rule and then transmits an ACK to the P-GW 1130. According to another exemplary embodiment of the present disclosure, step 1113 may be omitted.

In step 1115, the S-GW 1120 transmits a delete session response message to the MME 1160. That is, the S-GW 1120 transmits a response to the delete session request message received in step 1107. In step 1117, the MME 1160 transmits a deactivate bearer request message to a base station 1190. The deactivate bearer request message informs that deletion of a bearer owned by the terminal 1110 is requested. In step 1119, the base station 1190 transmits an RRC connection reconfiguration message to the terminal 1110. The RRC connection reconfiguration message instructs the terminal 1110 to delete RRC connection. For example, the RRC connection reconfiguration message includes information necessary for deleting RRC connection such as wireless bearer identification information or the like.

In step 1121, the terminal 1110 transmits an RRC connection reconfiguration complete message to the base station 1190. That is, the terminal 1110 transmits a response to the RRC connection reconfiguration message received in step 1119. That is, the RRC connection reconfiguration complete message informs that the deletion of the RRC connection is completed. In step 1123, the base station 1190 transmits a deactivate bearer response message to the MME 1160. That is, the base station 1190 transmits a response to the deactivate bearer request message received in step 1117. In step 1125, the terminal 1110 transmits a direct transfer message to the base station 1190. In step 1127, the base station 1190 transmits an EPS bearer context deactivate accept message to the MME 1160.

According to various exemplary embodiments of the present disclosure as described above, more control methods for the P-GW relocation may be provided to the operator. The operator may define policies for the levels of the session continuity provided for each flow or each user. In addition, various exemplary embodiments of the present disclosure can enhance network efficiency without badly affecting user QoE. In particular, the P-GW relocation based on "on-demand session continuity" may be triggered based on the current state of the flow.

In the 3GPP, there exists a research called "CSIPTO" for co-ordination of SIPTO traffic between multi-P-GWs. As mobile networks are growing up and dense arrangements are considered, the SIPTO is an effective solution to the off-loading of traffic via a local P-GW. In this case, the P-GW relocation may be factored in considering session continuity. The proposed mechanism allows the operator to define levels of session continuity of users to use network resources effectively. The on-demand session continuity allows the P-GW relocation in the middle of a session when QoE is not much degraded. Such a mechanism may be applied when the flows do not always require the session continuity, such as Dynamic Adaptive Streaming over HTTP (DASH) or a push service.

Figure 12:
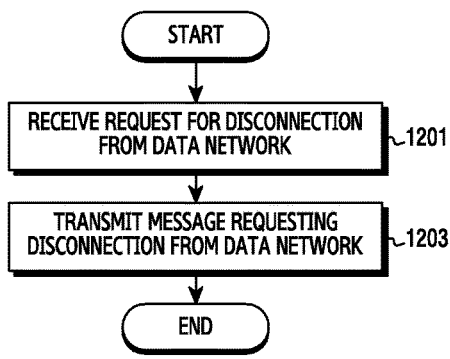
FIG. 12 illustrates a view showing an operation procedure of a terminal in a wireless communication system according to an exemplary embodiment of the present disclosure.

FIG. 12 illustrates a view showing an operation procedure of a terminal in a wireless communication system according to an exemplary embodiment of the present disclosure.

Referring to FIG. 12, the terminal receives a request for disconnection from a data network from one of the network entities in a core network in step 1201. For example, the request may be received from a network entity which manages mobility, that is, an MME. According to an exemplary embodiment of the present disclosure, the request may instruct prompt network disconnection, that is, unconditional network disconnection. According to another exemplary embodiment of the present disclosure, the request may instruct network disconnection at a time which is determined according to a pre-defined rule.

Thereafter, the terminal proceeds to step 1203 to transmit a message for requesting disconnection from the data network. The message may trigger the disconnection or may request one of the network entities of the core network to trigger the disconnection. According to an exemplary embodiment of the present disclosure, the terminal may transmit the message according to the request received in step 1201, without considering the state of at least one flow. According to another exemplary embodiment of the present disclosure, the terminal determines whether the disconnection from the data network is acceptable or not according to a pre-defined rule, and then, when the disconnection from the data network is acceptable, the terminal may transmit the message. For example, the pre-defined rule may be defined based on the state of the at least one flow owned by the terminal. For example, the terminal may transmit the message when a disorder is not created in the continuity of a service by the disconnection from the data network. Specifically, if a service performing continuous data consumption (e.g., video streaming, and online radio) is executed, the terminal may transmit the message when more than a predetermined amount data is buffered. Alternatively, if a service requiring discontinuous data transmission (e.g., chatting, an SNS, webpage searching) is executed, the terminal may transmit the message when there is no data currently being downloaded or no data to be transmitted.

Although not shown in FIG. 12, after transmitting the message requesting the disconnection from the data network, the terminal may perform a procedure for disconnecting from the data network. For example, the procedure for disconnecting from the data network may be performed as shown in FIG. 8 or 11. Thereafter, the terminal may perform a procedure for setting up connection with the data network again. Accordingly, an anchor gateway which serves as a connection point with the data network for the terminal is relocated.

According to another exemplary embodiment of the present disclosure, step 1203 may be omitted. In this case, the procedure for disconnecting from the data network may be initiated by the network. To achieve this, when the disconnection is performed according to the pre-defined rule, the terminal may provide information necessary for determining the time to accept the disconnection to the core network. For example, the information necessary for determining the time to accept the disconnection may include at least one of information for notifying that the disconnection is accepted and information for indicating the state of the flow.

Figure 13:
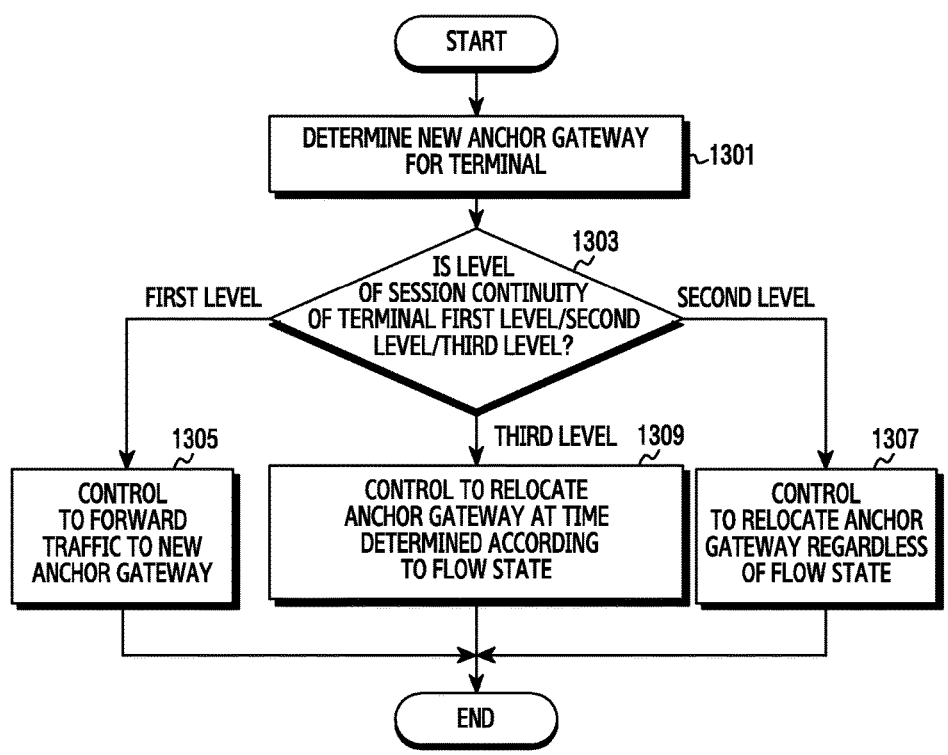
FIG. 13 illustrates a view showing an operation procedure of a network entity which manages mobility in a wireless communication system according to an exemplary embodiment of the present disclosure.

FIG. 13 illustrates a view showing an operation procedure of a network entity which manages mobility in a wireless communication system according to an exemplary embodiment of the present disclosure.

Referring to FIG. 13, in step 1301, the network entity determines a new anchor gateway for a terminal. For example, the network entity may determine the new anchor gateway based on at least one of a distance to the terminal and a traffic load. Herein, the distance includes at least one of a physical distance or a logical distance and the logical distance includes a data transfer delay time. The new anchor gateway may be determined when a Tracking Area (TA) of the terminal is updated.

After determining the new anchor gateway, the network entity proceeds to step 1303 to identify a level of session continuity of the terminal. According to an exemplary embodiment of the present disclosure, the level of the session continuity is divided into a first level, a second level, and a third level. The network entity retains session continuity information for each terminal or each flow of the terminal. When the terminal retains a plurality of flows and each flow has a different level of session continuity, a single level is selected according to pre-defined priority. The session continuity information may be provided to the network entity through at least one of a procedure in which the terminal initially accesses, a procedure in which a bearer is activated, and a procedure in which a bearer is modified. For example, the session continuity information may be provided through the procedure as shown in FIG. 4, 5, or 6. In this case, the network entity may be an MME.

When the level of the session continuity is the first level, the network entity proceeds to step 1305 to control the current anchor gateway to forward traffic to a P-GW which is selected as the new anchor gateway. That is, the first level refers to "always session continuity," and, in this case, the anchor gateway is not relocated. However, to provide IP mobility, the traffic destined for the terminal is transmitted to the terminal via the P-GW which is selected as the new anchor gateway. To achieve this, the current anchor gateway routes the data destined for the terminal to the P-GW which is selected as the new anchor gateway. To achieve this, the network entity transmits a message instructing to forward the traffic to the current anchor gateway. Herein, the message may include at least one of identification information of the P-GW selected as the new anchor gateway, information for requesting to provide the IP mobility via the P-GW, and information for indicating that the level of the session continuity of the terminal is "always session continuity."

When the level of the session continuity is the second level, the network entity proceeds to step 1307 to control to relocate the anchor gateway regardless of a flow state. That is, the second level refers to "no session continuity." To achieve this, the network entity transmits a request for data network reactivation to the terminal. In addition, after performing a procedure for the terminal to disconnect from the data network, the network entity performs a procedure for the terminal to set up connection with the data network. In this case, the network entity sets up connection with the data network via the P-GW which is selected as the new anchor gateway. To this end, the anchor gateway for the terminal is relocated. For example, the network entity performs the procedure as shown in FIG. 7.

When the level of the session continuity is the third level, the network entity proceeds to step 1309 to control to relocate the anchor gateway at a time which is determined according to the flow state. That is, the third level refers to "on-demand session continuity." To achieve this, the network entity transmits a request for data network deactivation to the terminal. The request instructs the terminal to relocate the anchor gateway, that is, instructs to determine the time to accept disconnection from the data network. Thereafter, the network entity controls to forward the traffic to the new anchor gateway, and then, performs a procedure for relocating the anchor gateway according to a request or notification from the terminal. For example, the network entity may perform the procedure as shown in FIG. 10.

Figure 14:
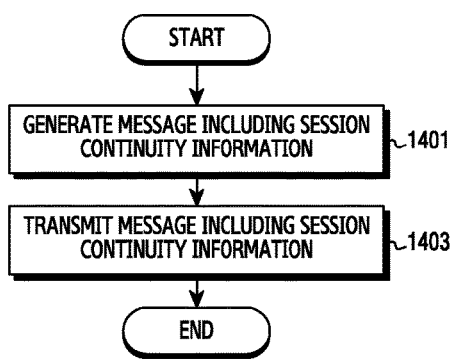
FIG. 14 illustrates a view showing an operation procedure of a network entity which provides session continuity information in a wireless communication system according to an exemplary embodiment of the present disclosure.

FIG. 14 illustrates a view showing an operation procedure of a network entity which provides session continuity information in a wireless communication system according to an exemplary embodiment of the present disclosure.

Referring to FIG. 14, the network entity generates a message including session continuity information in step 1401. The session continuity information may be provided by another network entity, inputted by a network operator, or generated according to a pre-defined rule. The pre-defined rule may be defined to classify the level of the session continuity based on one of a kind of application, an application provider, user subscription information, and an operator policy.

Thereafter, the network entity proceeds to step 1403 to transmit the message including the session continuity information. For example, step 1403 may be one of steps 405, 407, and 409 of FIG. 4, steps 505, 507, and 509 of FIG. 5, and steps 601, 613, 615, and 617 of FIG. 6. In addition, the network entity may be one of an HSS server, a PCRF server, a P-GW, and an S-GW.

Figure 15:
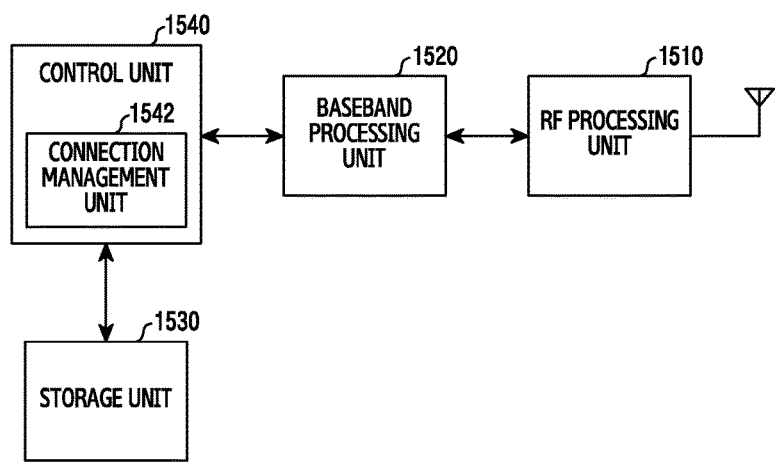
FIG. 15 illustrates a block diagram of a terminal in a wireless communication system according to an exemplary embodiment of the present disclosure.

FIG. 15 illustrates a block diagram of a terminal in a wireless communication system according to an exemplary embodiment of the present disclosure.

Referring to FIG. 15, the terminal includes a Radio Frequency (RF) processing unit 1510, a baseband processing unit 1520, a storage unit 1530, and a control unit 1540.

The RF processing unit 1510 performs a function for transmitting and receiving signals via a radio channel, such as signal band conversion, amplification, and the like. That is, the RF processing unit 1510 up-converts a baseband signal provided from the baseband processing unit 1520 into an RF band signal, transmits the RF band signal via an antenna, and down-converts an RF band signal received via the antenna into a baseband signal. For example, the RF processing unit 1510 may include a transmission filter, a reception filter, an amplifier, a mixer, an oscillator, a Digital-to-Analogue Converter (DAC), an Analogue to Digital Converter (ADC), and the like. In FIG. 15, only a single antenna is illustrated, but the terminal may include a plurality of antennas.

The baseband processing unit 1520 may convert between a baseband signal and a bit string according to a physical layer standard of a system. For example, when transmitting data, the baseband processing unit 1520 generates complex symbols by encoding and modulating transmission bit strings. In addition, when receiving data, the baseband processing unit 1520 may restore reception bit strings by demodulating and decoding baseband signals provided from the RF processing unit 1510. For example, according to the Orthogonal Frequency Division Multiplexing (OFDM) method, when transmitting data, the baseband processing unit 1520 generates the complex symbols by encoding and modulating the transmission bit strings, maps the complex symbols onto sub carriers, and configures OFDM symbols by performing an Inverse Fast Fourier Transform (IFFT) operation and inserting a Cyclic Prefix (CP). In addition, when receiving data, the baseband processing unit 1520 divides the baseband signal provided from the RF processing unit 1510 on an OFDM symbol basis, restores the signals which have been mapped onto sub carriers through the Fast Fourier Transform (FFT) operation, and then restores reception bit strings by demodulating and decoding. The baseband processing unit 1520 and the RF processing unit 1510 may transmit and receive the signals as described above. Accordingly, the baseband processing unit 1520 and the RF processing unit 1510 may be referred to as a transmitting unit, a receiving unit, a transmitting and receiving unit, or a communication unit.

The storage unit 1530 stores data such as basic programs, application programs, setting information, and temporary information for operations of the terminal. For example, the storage unit 1530 may provide stored data according to a request of the control unit 1540.

The control unit 1540 controls the overall operations of the terminal. For example, the control unit 1540 may transmit and receive signals through the baseband processing unit 1520 and the RF processing unit 1510. In addition, the control unit 1540 records and reads out data on and from the storage unit 1550. To achieve this, the control unit 1540 may include at least one processor. For example, the control unit 1540 may include a Communication Processor (CP) to control communication and an Application Processor (AP) to control upper layers such as application programs and the like. According to an exemplary embodiment of the present disclosure, the control unit 1540 may include a connection management unit 1542 to determine the time to accept disconnection from a data network. For example, the control unit 1540 may control the terminal to perform the procedures shown in FIG. 2 to FIG. 12. The operations of the control unit 1540 according to an exemplary embodiment of the present disclosure are as follows.

The control unit 1540 receives a request for disconnection from a data network from one of the network entities in a core network via the RF processing unit 1510 and the baseband processing unit 1520. The request may instruct prompt disconnection from the network or disconnection from the network at a time which is determined according to a pre-defined rule. Thereafter, the control unit 1540 proceeds to transmit a message requesting disconnection from the data network. Herein, the message may trigger the disconnection or may request one of the network entities of the core network to trigger the disconnection. According to an exemplary embodiment of the present disclosure, the control unit 1540 may transmit the message without considering the state of at least one flow. According to another exemplary embodiment of the present disclosure, the control unit 1540 determines whether disconnection from the data network is acceptable or not according to the pre-defined rule, and then, when the disconnection from the data network is acceptable, transmits the message. For example, the pre-defined rule may be defined based on the state of at least one flow owned by the terminal. Thereafter, the controller unit 1540 may perform a procedure for disconnecting from the data network. For example, the procedure for disconnecting from the data network may be performed as shown in FIG. 8 or FIG. 11. Thereafter, the control unit 1540 may perform a procedure for setting up connection with the data network again. Accordingly, an anchor gateway which serves as a connection point with the data network for the terminal is relocated.

According to another exemplary embodiment of the present disclosure, the control unit 1540 may not transmit the message requesting the disconnection from the data network. In this case, the procedure for disconnecting from the data network is initiated by the network. To achieve this, when the disconnection is performed according to the pre-defined rule, the control unit 1540 may provide information necessary for determining the time to accept the disconnection to the core network.

Figure 16:
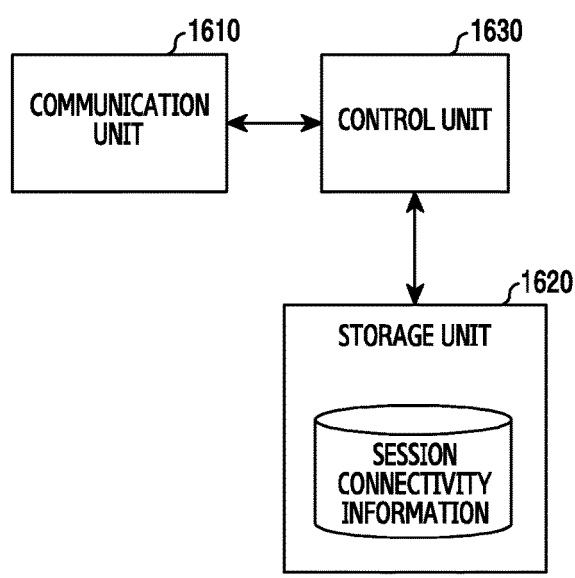
FIG. 16 illustrates a block diagram of a network entity in a wireless communication system according to an exemplary embodiment of the present disclosure.

FIG. 16 illustrates a block diagram of a network entity in a wireless communication system according to an exemplary embodiment of the present disclosure.

As shown in FIG. 16, the network entity includes a communication unit 1610, a storage unit 1620, and a control unit 1630.

The communication unit 1610 provides an interface for communicating with other entities in the network. That is, the communication unit 1610 converts bit strings transmitted from the network entity to another entity into physical signals, and converts physical signals received from another entity into bit strings.

The storage unit 1620 stores data such as basic programs, application programs, setting information, or the like for operations of the network entity. According to an exemplary embodiment of the present disclosure, the storage 1620 stores and manages session continuity information of the terminal. The session continuity information includes a level of session continuity. The level of the session continuity is divided into "always session continuity," "no session continuity," and "on-demand session continuity." In addition, the storage 1620 provides stored data according to a request of the control unit 1630.

The control unit 1630 controls the overall operations of the network entity. For example, the control unit 1630 may transmit and receive signals through the communication unit 1610. In addition, the control unit 1630 records and reads out data on and from the storage unit 1620. According to an exemplary embodiment of the present disclosure, the control unit 1630 may control a procedure for relocating an anchor gateway of the terminal. In addition, the control unit 1630 may be provided with the session continuity information stored in the storage 1620 from another entity or may provide the session continuity information to another entity. For example, the control unit 1630 controls the network entity to perform the procedures shown in FIGS. 2 to 11, 13, and 14. The operations of the control unit 1630 according to an exemplary embodiment of the present disclosure are as follows.

According to an exemplary embodiment of the present disclosure, the control unit 1630 determines a new anchor gateway for the terminal. For example, the control unit 1630 may determine the new anchor gateway based on at least one of a physical distance or a logical distance to the terminal, a data transfer delay time, and a traffic load. Thereafter, when the level of the session continuity is a first level, the control unit 1630 controls a current anchor gateway to forward traffic to a P-GW which is selected as the new anchor gateway. Specifically, the control unit 1630 may transmit a message instructing to forward the traffic to the current anchor gateway via the communication unit 1610. When the level of the session continuity is a second level, the control unit 1630 controls to relocate the anchor gateway regardless of a flow state. To achieve this, the control unit 1630 transmits a request for data network reactivation to the terminal via the communication unit 1610, and, after performing a procedure for the terminal to disconnect from the data network, performs a connection setup procedure for the terminal with the data network. When the level of the session continuity is a third level, the control unit 1630 controls to relocate the anchor gateway at a time which is determined according to a flow state. To achieve this, the control unit 1630 transmits a request for data network deactivation to the terminal via the communication unit 1610, and, after controlling to forward the traffic to the new anchor gateway, may perform a procedure for relocating the anchor gateway according to a request or notification from the terminal.

According to another exemplary embodiment of the present disclosure, the control unit 1630 generates a message including session continuity information and transmits the message including the session continuity information. That is, the network entity may be one of an HSS server, a PCRF server, a P-GW, and an S-GW. In this case, the session continuity information may be provided by another network entity, inputted by a network operator, or generated according to a pre-defined rule. The pre-defined rule may be defined to classify the level of the session continuity based on one of a kind of application, an application provider, user subscription information, and an operator policy.

A connection point with a data network is managed based on information on session continuity for each user or each flow and a state of a flow in a wireless communication system, so that network efficiency can be enhanced without badly affecting user QoE.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In the above-described exemplary embodiments, the elements included in the present disclosure are expressed in a singular form or a plural form according to an exemplary embodiment. However, the singular form or plural form is only selected to correspond to a situation suggested for convenience of explanation and the present disclosure is not limited to a single element or a plurality of elements, and the elements expressed in the plural form may be configured as a single element or the element expressed in the singular form may be configured as plural elements.

What is claimed is:

1. A method for operating a terminal in a wireless communication system, the method comprising:
   receiving, from a network entity, a first message for requesting a relocation of an anchor gateway for connecting with a data network;
   transmitting, to the network entity, an acknowledge (ACK) responding to the first message;
   transmitting, to the network entity, a second message for initiating the relocation of the anchor gateway at a time which is determined based on a state of at least one flow of the terminal;
   performing a first procedure for releasing a connection with the data network via a first gateway; and
   performing a second procedure for establishing a connection with the data network via a second gateway,
   wherein the time is determined based on a rule related to the state of the at least one flow, and
   wherein the rule is defined according to at least one of a type of service provided on the at least one flow, an amount of data in a download buffer, and expected data transmission on the at least one flow.

2. The method of claim 1, wherein the first message instructs a relocation based on the state of the at least one flow.

3. The method of claim 1, wherein the transmitting the second message comprises, if more than a predetermined amount data is buffered for an application related to the at least one flow which is being executed, transmitting the second message.

4. The method of claim 1, where the transmitting the second message comprises, if there is no data being downloaded or no data to be transmitted for an application related to the at least one flow which is being executed, transmitting the second message.

5. The method of claim 1, wherein the second message requests to perform the first procedure to the network entity, or informs that the time arrives to the network entity.

6. A method for operating a network entity in a wireless communication system, the method comprising:
   if a change of anchor gateway for a terminal is determined, identifying information on session continuity of the terminal, the information indicating a level where a relocation is accepted based on a state of at least one flow;
   transmitting, to the terminal, a first message for requesting the relocation of an anchor gateway for connecting with a data network;
   receiving, from the terminal, an acknowledge (ACK) responding to the first message;
   receiving, from the terminal, a second message for initiating the relocation of the anchor gateway at a time which is determined based on a state of the at least one flow of the terminal;
   performing a first procedure for releasing a connection with the data network via a first gateway; and
   performing a second procedure for establishing a connection with the data network via a second gateway,
   wherein the time is determined based on a rule related to the state of the at least one flow, and
   wherein the rule is defined according to at least one of a type of service provided on the at least one flow, an amount of data in a download buffer, and expected data transmission on the at least one flow.

7. The method of claim 6, further comprising:
   transmitting a message for requesting to forward traffic from the first gateway to the second gateway.

8. The method of claim 6, further comprising receiving the information on the session continuity from another network entity, and
   wherein the information on the session continuity is received through at least one of a procedure in which the terminal initially accesses, a procedure in which a bearer is activated, and a procedure in which a bearer is modified.

9. A terminal in a wireless communication system, the terminal comprising:
a transceiver; and
at least one processor coupled to the transceiver,
wherein the transceiver is configured to:
receive, from a network entity, a first message for requesting a relocation of an anchor gateway for connecting with a data network,
transmit, to the network entity, an acknowledge (ACK) responding to the first message; and
transmit, to the network entity, a second message for initiating the relocation of the anchor gateway at a time which is determined based on a state of at least one flow of the terminal,
wherein the at least one processor configured to:
perform a first procedure for releasing a connection with the data network via a first gateway, and
perform a second procedure for establishing a connection with the data network via a second gateway,
wherein the time is determined based on a rule related to the state of the at least one flow, and
wherein the rule is defined according to at least one of a type of service provided on the at least one flow, an amount of data in a download buffer, and expected data transmission on the at least one flow.

10. The terminal of claim 9, wherein the first message instructs a relocation based on the state of the at least one flow.

11. The terminal of claim 9, wherein, if more than a predetermined amount data is buffered for an application related to the at least one flow which is being executed, the transceiver is configured to transmit the second message.

12. The terminal of claim 9, where, if there is no data being downloaded or no data to be transmitted for an application related to the at least one flow which is being executed, the transceiver is configured to transmit the second message.

13. The terminal of claim 9, wherein the second message requests to perform the first procedure to the network entity, or informs that the time arrives to the network entity.

14. A network entity in a wireless communication system, the network entity comprising:
a transceiver; and
at least one processor coupled to the transceiver and configured to:
if a change of an anchor gateway for a terminal is determined, identify information on session continuity of the terminal, the information indicating a level where a relocation is accepted based on a state of at least one flow;
transmit a first message for requesting relocation of an anchor gateway for connecting with a data network;
receive, from the terminal, an acknowledge (ACK) responding to the first message;
receive, from the terminal, a second message for initiating the relocation of the anchor gateway at a time which is determined based on a state of the at least one flow of the terminal;
perform a first procedure for releasing a connection with the data network via a first gateway; and
perform a second procedure for establishing a connection with the data network via a second gateway,
wherein the time is determined based on a rule related to the state of the at least one flow, and
wherein the rule is defined according to at least one of a type of service provided on the at least one flow, an amount of data in a download buffer, and expected data transmission on the at least one flow.

15. The network entity of claim 14, wherein the at least one processor is further configured to transmit a message for requesting to forward traffic from the first gateway to the second gateway.

16. The network entity of claim 14, wherein the at least one processor is further configured to receive information on the session continuity from another network entity, and
wherein the information on the session continuity is received through at least one of a procedure in which the terminal initially accesses, a procedure in which a bearer is activated, and a procedure in which a bearer is modified.

* * * * *